(12) United States Patent
Alexander et al.

(10) Patent No.: US 9,983,315 B1
(45) Date of Patent: May 29, 2018

(54) SATELLITE NAVIGATION RECEIVER FOR A RAPIDLY ROTATING OBJECT WITH IMPROVED RESISTANCE TO JAMMING

(71) Applicant: Interstate Electronics Corporation, Anaheim, CA (US)

(72) Inventors: Steven B. Alexander, Orange, CA (US); Richard F. Redhead, Mission Viejo, CA (US)

(73) Assignee: Interstate Electronics Corporation, Anaheim, CA (US)

( * ) Notice: Subject to any disclaimer, the term of this patent is extended or adjusted under 35 U.S.C. 154(b) by 329 days.

(21) Appl. No.: 14/726,086

(22) Filed: May 29, 2015

(51) Int. Cl.
*G01S 19/53* (2010.01)

(52) U.S. Cl.
CPC .................. *G01S 19/53* (2013.01)

(58) Field of Classification Search
CPC .................................................. G01S 19/53
USPC ..................................................... 342/357.36
See application file for complete search history.

(56) References Cited

U.S. PATENT DOCUMENTS

| | | | |
|---|---|---|---|
| 4,190,895 A | 2/1980 | Davis | |
| 5,507,452 A * | 4/1996 | Mayersak | F41G 7/007 102/384 |
| 5,619,524 A | 4/1997 | Ling et al. | |
| 5,635,864 A | 6/1997 | Jones | |
| 5,775,636 A | 7/1998 | Vig et al. | |
| 6,259,400 B1 * | 7/2001 | Higgins | F41G 7/301 342/357.22 |
| 6,502,786 B2 * | 1/2003 | Rupert | F42B 10/50 244/3.1 |
| 6,520,448 B1 * | 2/2003 | Doty | F42B 15/01 244/3.1 |
| 6,573,486 B1 | 6/2003 | Ratkovic et al. | |
| 6,590,528 B1 * | 7/2003 | DeWulf | G01S 19/18 342/357.63 |
| 6,615,734 B2 | 9/2003 | Koch et al. | |
| 6,766,150 B1 * | 7/2004 | Johnson | H03J 1/0008 455/120 |
| 6,779,752 B1 * | 8/2004 | Ratkovic | F41G 7/346 244/3.1 |
| 7,163,176 B1 | 1/2007 | Geswender et al. | |
| 7,183,971 B1 | 2/2007 | Lloyd et al. | |
| 7,698,983 B1 * | 4/2010 | Pinto | F42C 17/00 102/275.11 |
| 7,986,265 B2 | 7/2011 | Alexander et al. | |
| 8,199,052 B1 | 6/2012 | Alexander et al. | |
| 8,305,265 B2 | 11/2012 | Ezal et al. | |

(Continued)

OTHER PUBLICATIONS

USPTO; Office Action dated Dec. 30, 2010, from related U.S. Appl. No. 12/231,315, (filed Aug. 29, 2008).

(Continued)

*Primary Examiner* — Frank J McGue
(74) *Attorney, Agent, or Firm* — Knobbe, Martens, Olson & Bear LLP

(57) ABSTRACT

Apparatus and methods determine the rotational position of a spinning object. A satellite positioning system can be used to determine the spatial position of an object, which in turn can be used to guide the object. An adaptive sideband filter is used to provide increased robustness against interference. However, when the object is spinning, such as an artillery shell, then the rotational orientation should be known in order to properly actuate the control surfaces, such as fins, which will also be spinning.

22 Claims, 14 Drawing Sheets

(56) References Cited

U.S. PATENT DOCUMENTS

| | | | |
|---|---|---|---|
| 8,711,035 B1 | 4/2014 | Alexander et al. | |
| 9,429,660 B2* | 8/2016 | Luo | G01S 19/54 |
| 9,645,251 B1* | 5/2017 | Gibbons | G01P 3/481 |
| 2006/0017498 A1 | 1/2006 | Kuhn et al. | |
| 2008/0297263 A1 | 12/2008 | Park | |
| 2010/0007555 A1 | 1/2010 | Ezal et al. | |
| 2010/0289687 A1 | 11/2010 | Vander Velde et al. | |
| 2013/0169477 A1* | 7/2013 | Luo | G01S 19/53 |
| | | | 342/357.37 |
| 2014/0320339 A1 | 10/2014 | Alexander et al. | |

OTHER PUBLICATIONS

USPTO; Office Action dated Nov. 25, 2011, from related U.S. Appl. No. 13/189,962, (filed Jul. 25, 2011).

USPTO; Office Action dated Feb. 7, 2013, from related U.S. Appl. No. 13/492,447, (filed Jun. 8, 2012).

USPTO; Office Action dated Jun. 19, 2013, from related U.S. Appl. No. 13/492,447, (filed Jun. 8, 2012).

* cited by examiner

Phase Rotator / Mixer

SATELLITE NAVIGATION RECEIVER FOR A RAPIDLY ROTATING OBJECT WITH IMPROVED RESISTANCE TO JAMMING

CROSS-REFERENCE TO RELATED APPLICATIONS

This application is related to U.S. application Ser. No. 14/263,820, filed Apr. 28, 2014, which is a continuation application of U.S. application Ser. No. 13/492,447, filed Jun. 8, 2012, now U.S. Pat. No. 8,711,035, issued on Apr. 29, 2014, which is a continuation application of U.S. application Ser. No. 13/189,962, filed Jul. 25, 2011, now U.S. Pat. No. 8,199,052, issued on Jun. 12, 2012, which is a continuation application of U.S. application Ser. No. 12/231,315, filed Aug. 29, 2008, now U.S. Pat. No. 7,986,265, issued on Jul. 26, 2011, the entireties of which are incorporated by reference herein.

BACKGROUND

Field of the Invention

The invention generally relates to electronics. In particular, the invention relates to a receiver for a satellite navigation system, such as the NAVSTAR Global Positioning System (GPS).

Description of the Related Art

A Global Positioning System (GPS) satellite radiates a spread spectrum, pseudorandom noise (PN) signal indicating the satellite's position and time. A GPS receiver that receives signals from a plurality of satellites can compute the distance to each satellite and then calculate the receiver's spatial position, spatial velocity, and time.

GPS receivers can be used in a broad variety of environments. One application is to provide spatial position and spatial velocity for a projectile, such as an artillery shell. This information can then be used by a guidance system of the projectile to guide the projectile to its intended destination.

Flight corrections can be made by manipulating fins on the projectile. However, the projectile can be configured to spin along an axis in its line of flight to stabilize flight. This spin affects the flight controls for guidance, as the fins will spin with the projectile. In order to make proper flight corrections, the rotational orientation of the projectile should be known.

SUMMARY

Apparatus and methods determine the rotational position of an object. A satellite positioning system can be used to determine the spatial position of an object, which in turn can be used to guide the object. However, for guidance of an object that spins during flight, such as an artillery shell, then the rotational orientation should also be known in order to properly time the actuation of the control surfaces. Disclosed techniques ascertain the rotational position from the satellite positioning system signals. The disclosed techniques can be used with the coarse/acquisition C/A code, precise P(Y) code, or both the C/A code and the P(Y) code.

One embodiment includes an apparatus, wherein the apparatus includes: an adaptive sideband filter configured to separately filter sidebands and a center frequency of a correlated in-phase signal and a correlated quadrature-phase signal to generate a filtered correlated in-phase output signal and a filtered correlated quadrature-phase output signal; and a SV power modulation tracker configured to determine an angular orientation of a spinning object based at least partly on at least one of the filtered correlated in phase signal or the filtered correlated quadrature phase signal.

One embodiment includes a method for filtering, wherein the method includes: receiving a correlated in-phase signal (Iu) and a correlated quadrature-phase signal (Qu), wherein the correlated in phase signal and the correlated quadrature phase signal contain sidebands due to power modulation from rolling of a spinning object; separately filtering the sidebands and a center frequency of the correlated in phase signal and the correlated quadrature-phase signal to generate a filtered correlated in phase signal and a filtered correlated quadrature phase signal; and determining an angular orientation of the spinning object based at least partly on at least one of the filtered correlated in phase signal or the filtered correlated quadrature phase signal.

One embodiment includes an apparatus, wherein the apparatus includes: a means for separately filtering sidebands and a center frequency of a correlated in-phase signal and a correlated quadrature-phase signal to generate a filtered correlated in phase signal and a filtered correlated quadrature phase signal; and a SV power modulation tracker configured to determine an angular orientation of a spinning object based at least partly on at least one of the filtered correlated in phase signal or the filtered correlated quadrature phase signal.

BRIEF DESCRIPTION OF THE DRAWINGS

These drawings the associated description herein are provided to illustrate specific embodiments of the invention and are not intended to be limiting.

DETAILED DESCRIPTION OF EMBODIMENTS

Although particular embodiments are described herein, other embodiments of the invention, including embodiments that do not provide all of the benefits and features set forth herein, will be apparent to those of ordinary skill in the art.

While illustrated in the context of the NAVSTAR Global Positioning System (GPS), the principles and advantages described herein are applicable to other positioning systems, such as, but not limited to, the Russian GLONASS system, the European Galileo system, the Chinese COMPASS system, the Indian IRNSS system, or the like.

Figure 1:
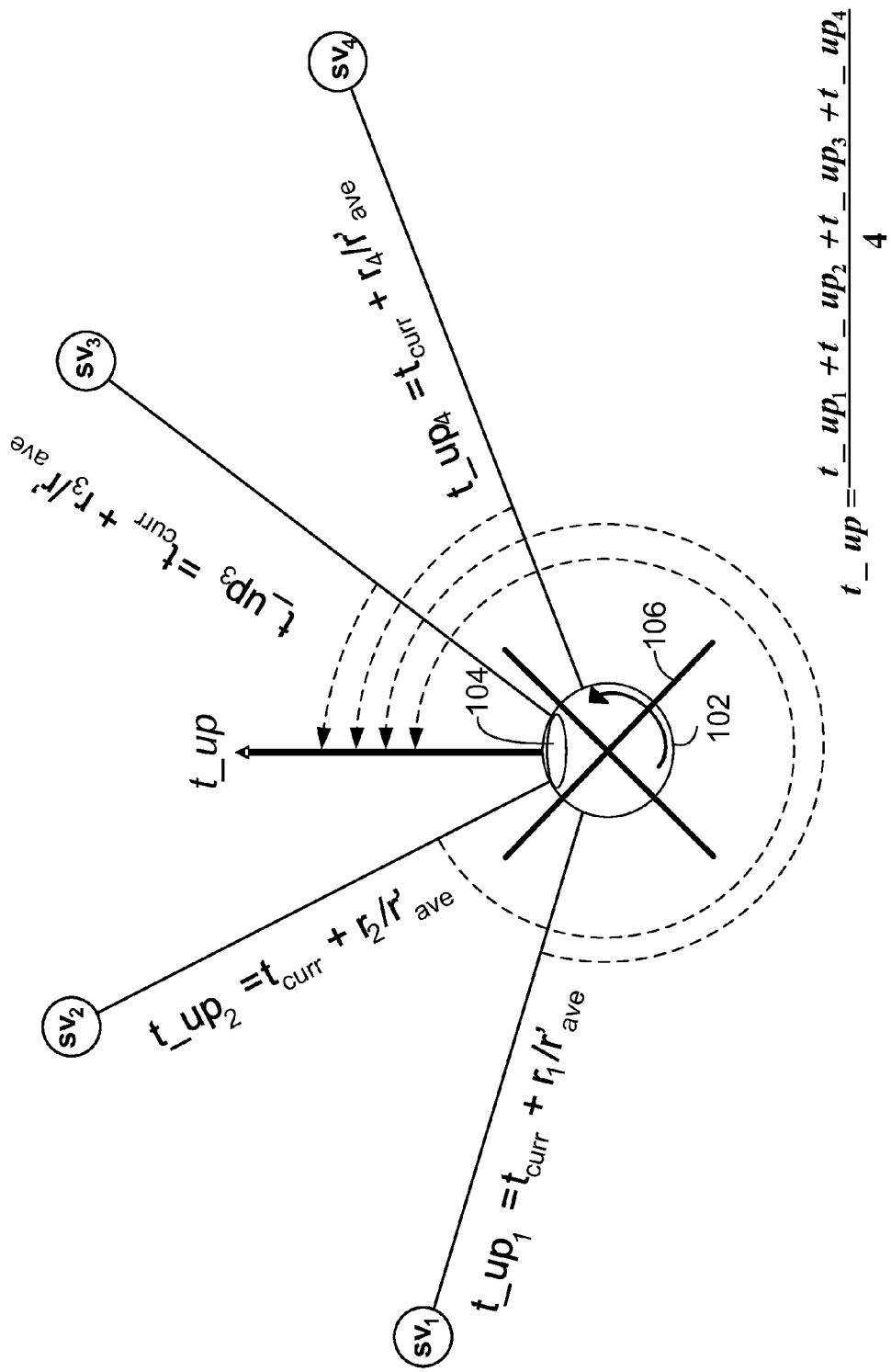
FIG. 1 is a schematic diagram drawn looking down the nose of a projectile and illustrates timing references and nomenclature used for the projectile and space vehicles (SVs).

FIG. 1 is a schematic diagram drawn looking down the nose of a projectile 102 and illustrating timing references and nomenclature used for the projectile 102 and space vehicles (SVs). FIG. 1 depicts how SVs in view are used in combination to estimate the projectile's roll.

FIG. 1 illustrates the projectile 102 in the center of the diagram, one or more antennas 104, and one or more fins 106. The illustrated techniques can assess when an antenna 104 of the projectile 102 is effectively pointing to a space vehicle.

In the diagram, the projectile 102 is shown rotating counter-clockwise; however, the techniques disclosed herein are applicable to rotation in either direction. The direction of the rotation will follow the rifling of a barrel of a cannon and is typically known before the projectile is launched from the cannon.

Typically, the space vehicles $sv_1$, $sv_2$, $sv_3$, and $sv_4$, are the sources for GPS signals. However, other sources, such as beacons, can be applicable. The number of space vehicles used by the projectile 102 can vary in a broad range, but typically reception to at least four space vehicles is needed to resolve spatial position.

The receiver for the projectile 102 has a plurality of phase-locked loops (PLLs) for determining the angular orientation of SVs based on signal power modulation. In the illustrated embodiment, for each SV, there is a corresponding PLL of the receiver for determining when the antenna pattern of the antenna 104 is generally pointing towards a particular SV, referred to as "up." This "pointing towards" refers to the rotation and not to an aspect angle. In the illustrated embodiment, these PLLs along with line-of-sight (LOS) vector information are used to calculate the time ($t\_up_i$) when the pattern of the antenna 104 will be pointing "up" with respect to a particular i-th SV. In one embodiment, this "next up time" $t\_up_i$ is independently calculated for each SV in view of the receiver, and then the independent calculations are averaged together, which averages out errors.

This averaged "next up time" is represented by variable $t\_up$. At the averaged next up time $t\_up_i$, the pattern of the antenna 104 of the projectile 102 is "pointing" at the average of the independent up times, so that the average is generally pointing away from the center of the earth. The averaged next up time $t\_up$ is provided as an index for flight control.

A next up time $t\_up_i$ for a particular i-th space vehicle $SV_i$ represents a time estimate of the next time that the pattern of the antenna 104 faces towards the i-th space vehicle $SV_i$. Every space vehicle in view can be used to estimate a particular next up time $t\_up_i$, but an individual estimate is relatively noisy due to the stochastic nature of a phase-locked loop. Averaging multiple up time estimates $t\_up_i$ smoothes this noise and provides a more accurate estimate for a reference time $t\_up$ when the pattern of the antenna will be in a particular orientation, in this case, up with respect to an average. In the illustrated embodiment, equal weighting is used for the averaging; however, an unequally weighted average can also be used. For example, signals received from space vehicles with lower signal power can be weighted less heavily than signals received from space vehicles with higher signal power.

Figure 2:
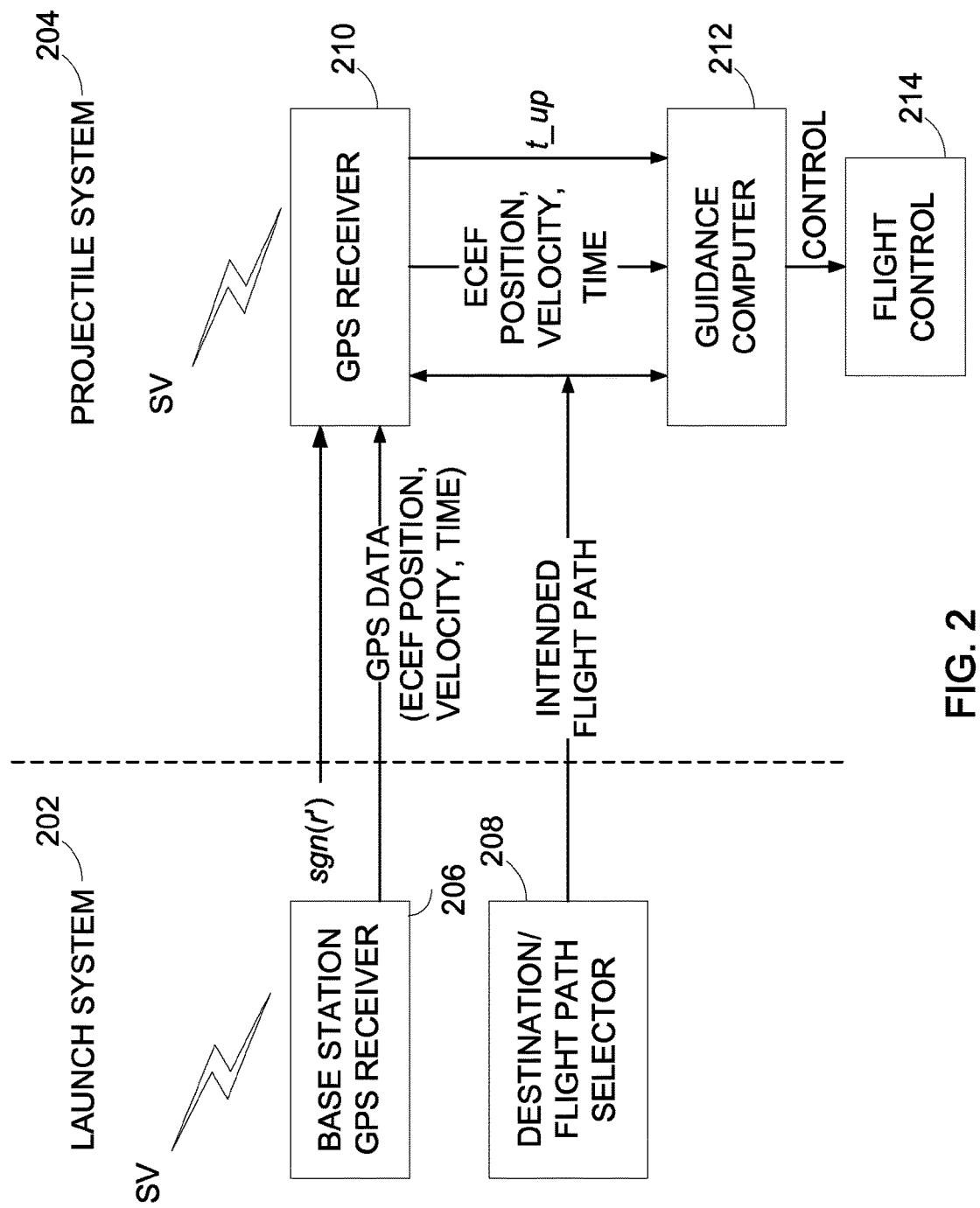
FIG. 2 illustrates a top-level block diagram of a GPS launch system and a GPS projectile system according to an embodiment of the invention.

FIG. 2 illustrates a top-level block diagram of a launch system 202 and a projectile system 204 according to an embodiment of the invention. FIG. 2 illustrates electronic components for the launch system 202. Other components can include, for example, a cannon for the launch of a projectile. The launch system 202 components are typically reusable, and are used, for example, on the ground, in a truck, in a ship, in an airplane, or the like. The launch system 202 includes a base station GPS receiver 206 and a destination/flight path selector 208.

The base station GPS receiver 206 receives GPS signals and communicates information to the projectile system 204 such that the projectile system 204 can readily acquire the GPS signals after launch. In a GPS receiver, "acquiring" a satellite occurs when the GPS receiver acquires the signal of a satellite. The GPS receiver acquires the satellite by matching a code received by the GPS receiver to a code defined for the satellite. In an enhancement, the matching is performed to the carrier wave that is carrying the ranging code. This code and/or carrier phase matching is termed "correlation." For example, when the projectile system 204 is loaded into a cannon for launch, it is typically not able to receive normal GPS signals. Accordingly, the base station GPS receiver 206 can preload a GPS receiver 210 with data indicating which satellites are in the area for reception, GPS system time, ephemeris data for the satellites, and the like. The destination/flight path selector 208 provides information such as a flight path to an intended destination for the projectile. In one embodiment, an interface such as an inductive coupler is used to preload the GPS data and the intended flight path data from the launch system 202 to the projectile system 204 before the projectile is launched. After the projectile is launched, the launch system 202 and the projectile system 204 are typically not in communication. The intended flight path data can also include expected velocity at various points along the intended flight path. Of course, other data can also be provided, and status communication can also be returned from the projectile system 204 to the launch system 202.

The projectile system 204 includes the GPS receiver 210, a guidance computer 212, and a flight control 214. For clarity, other components of the projectile system 204, such as the components of an artillery shell, are not shown. For example, the flight control 214 can correspond to actuators for moving or deforming fins, to brakes, or the like. These actuators can be electromechanical, piezoelectric, or the like. An input sgn(r'), which can be provided by the launch system 202, indicates rotational direction of the projectile during flight.

In the illustrated embodiment, the GPS receiver 210 and the guidance computer 212 both receive the intended flight path. In the illustrated embodiment, line-of-sight (LOS) vectors are calculated using the intended flight path and time. The LOS vectors will be described in greater detail later in connection with FIG. 3. In an alternative embodiment, the LOS vectors are computed conventionally, that is, using the position of the projectile as obtained via GPS and the position of the satellites.

The GPS receiver 210 provides the spatial position of the projectile to the guidance computer 212 so that the guidance computer 212 can make adjustments to the actual flight path. Such adjustments can be one-dimensional (range only) as encountered with brakes, or can be two-dimensional.

The GPS receiver 210 also provides the guidance computer 212 with a reference time to indicate rotation. In the illustrated embodiment, the reference time t_up is referenced to GPS system time, and indicates when the projectile is expected to be "up," that is, would have a particular angular position. The particular angular position can be used as an index by the guidance computer 212. In the illustrated embodiment, the particular angular position is the average of "up" positions to the satellites in view. While this average can vary over time, it is fixed enough to be useful for guidance. In an alternate embodiment, the GPS receiver 210 can provide a different type of indicator, such as, for example, an edge on a clock signal, a data register indicating approximate angle, or the like. One embodiment of the GPS receiver 210 will be described in greater detail later in connection with FIG. 3.

As described earlier, both the GPS receiver 210 and the guidance computer 212 receive the intended flight path. The guidance computer 212 also receives the spatial position from the GPS receiver 210 and determines whether or not to adjust the actual flight path. If the projectile is spinning and is guided by manipulating fins, then the fins will typically be spinning with the projectile. The guidance computer 212 uses the rotation indicator sgn(r') to determine how to actuate the flight controls to adjust the actual flight path.

Figure 3:
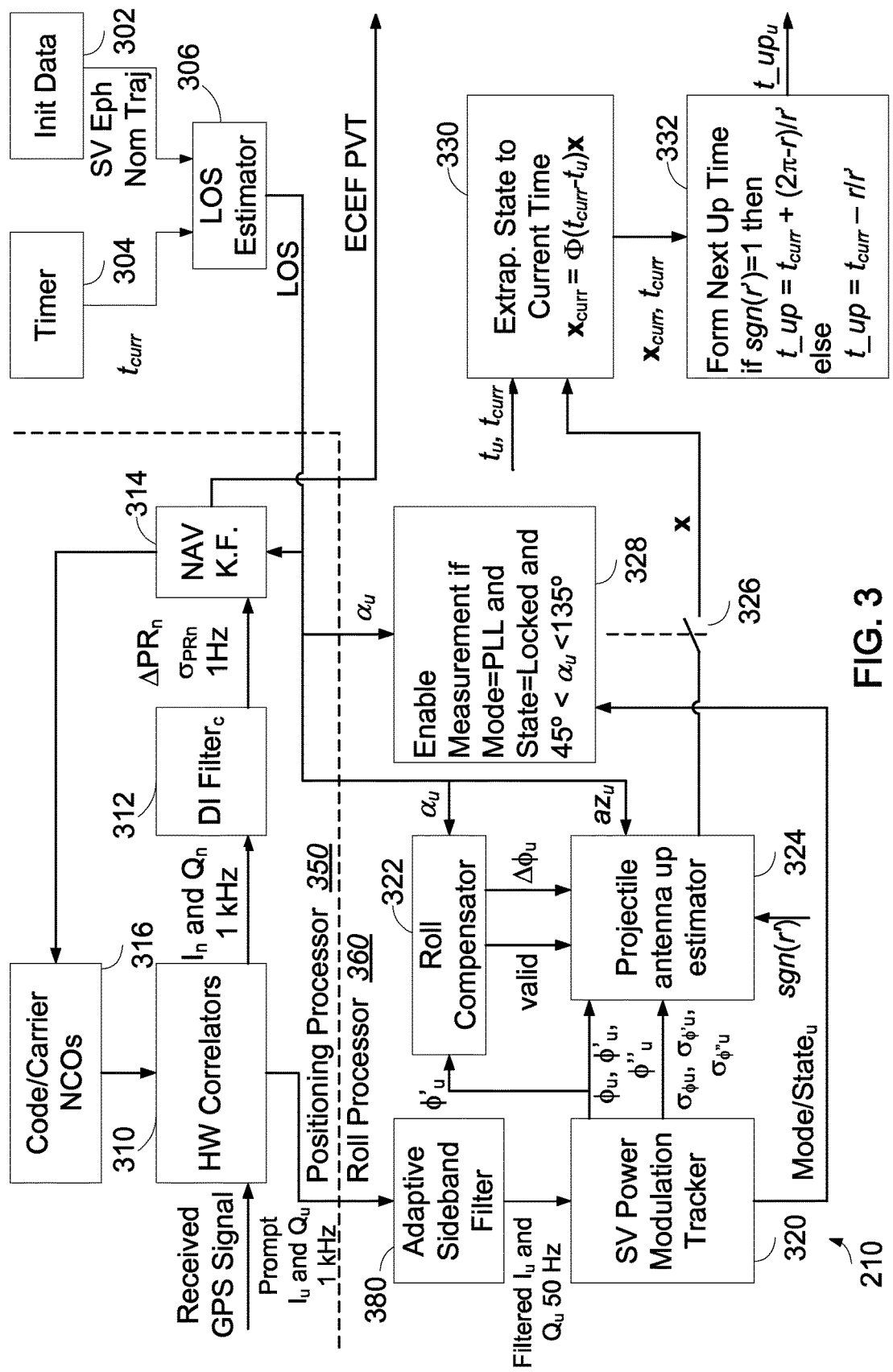
FIG. 3 illustrates one embodiment of a GPS receiver for determining the next time that the antenna will be facing up t_up.

FIG. 3 illustrates a system diagram for one embodiment of the GPS receiver 210 for estimating an averaged next up time t_up. Initialization data 302, such as data coupled from the launch system 202 (FIG. 2), can include space vehicle ephemeris data, GPS system time, both as determined by the base station GPS receiver 206, and an intended trajectory or nominal trajectory for the projectile. A dashed line separates components for a positioning processor 350 and components for a roll processor 360. In the illustrated embodiment, the positioning processor 350 portion of the GPS receiver 210 is conventional.

Various components can be implemented in hardware, in software/firmware, or in a combination of both hardware and software/firmware. In one embodiment, the hardware correlators 310 and the code/carrier numerically controlled oscillators 316 are implemented by hardware, and the other components of the GPS receiver 210 are implemented in software/firmware. For example, executable instructions can be stored in a computer-readable medium, such as RAM or ROM memory, and executed by a processor, such as a microprocessor. For example, the instructions can be embedded into flash ROM of the GPS receiver 210. In another example, the instructions can be loaded into RAM from the launch system 202.

In the illustrated embodiment, after initialization from the launch system 202, an independent timer 304 maintains a "current time," which is denoted with variable $t_{curr}$. The current time $t_{curr}$ is independent of GPS signals received by the GPS receiver 210 and independent of GPS system time after launch. In one embodiment, the timer 304 is maintained by software/firmware.

In the illustrated embodiment, the positioning processor 350 is conventional. For example, the illustrated positioning processor 350 includes hardware correlators 310, a deep integration filter 312, a navigation Kalman filter 314, and code/carrier numerically controlled oscillators 316 arranged in a tracking loop. Received GPS signals are provided as an input to the HW correlators 310. The HW correlators 310 correlate the received GPS signal with the receiver's best estimate of a replica signal to generate in-phase (I) and quadrature-phase data (Q) that contain projectile position error measurements and SV power measurements. In one embodiment, the navigation Kalman filter 314 has 12 states and computes position, velocity, acceleration, and time. For clarity, antennas and front-end components of the GPS receiver 210 are not shown in FIG. 3. An output of the positioning processor 350 is the ECEF position, velocity, and time, which is provided as an input to the guidance computer 212.

In the illustrated embodiment, for calculating LOS vectors, an LOS estimator 306 estimates its location using the current time $t_{curr}$ and the intended or nominal trajectory (preloaded), and estimates the location of a space vehicle using the current time $t_{curr}$ and the SV ephemeris data (preloaded). The LOS estimator 306 can be implemented in hardware or in software/firmware. In the illustrated embodiment, the LOS estimator 306 is implemented in software/firmware. Advantageously, the LOS vectors can be computed even when the GPS receiver 210 encounters interference. This can improve tracking under certain circumstances and reduce computation time in flight.

Figure 9:
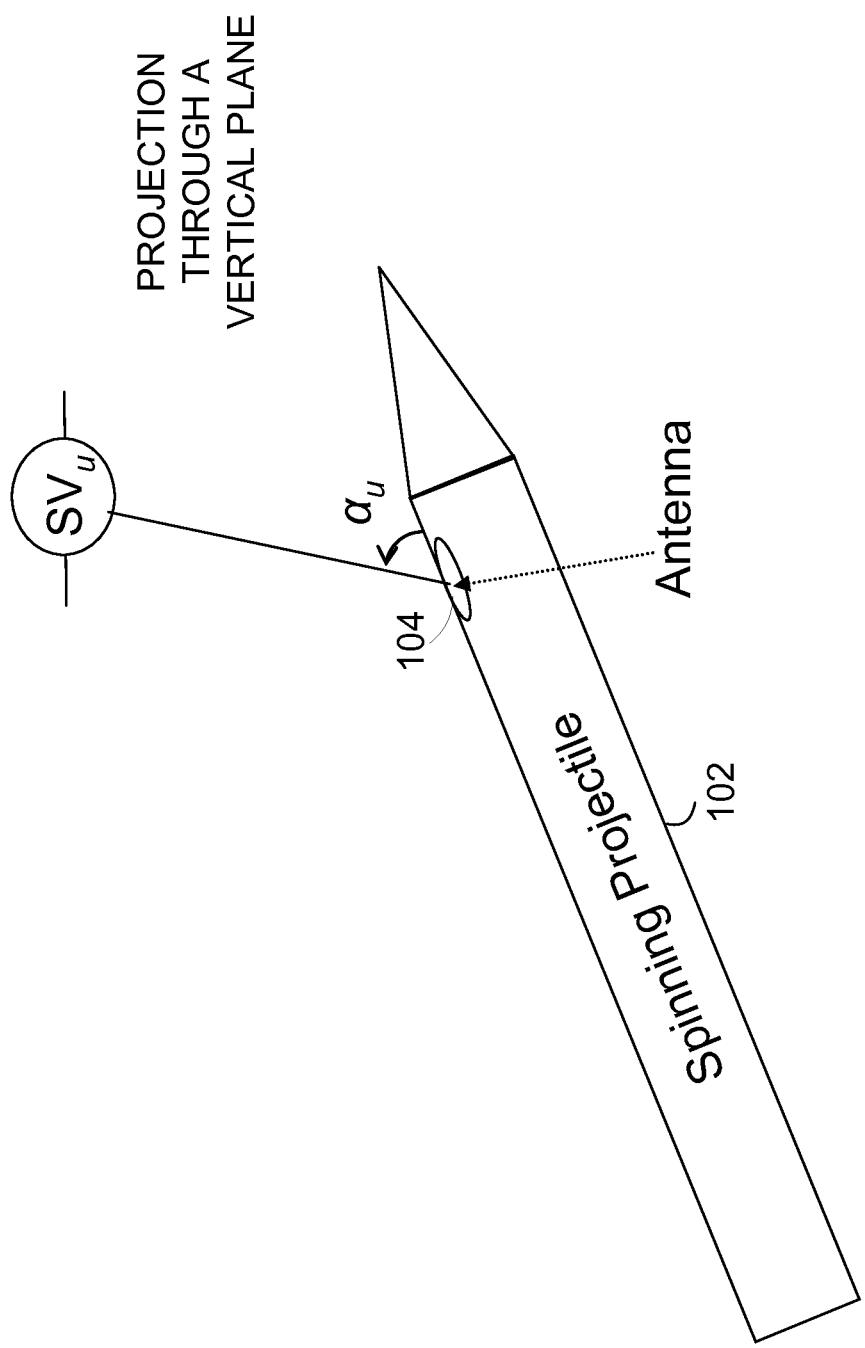
FIG. 9 illustrates an aspect angle $\alpha_u$.
Figure 10:
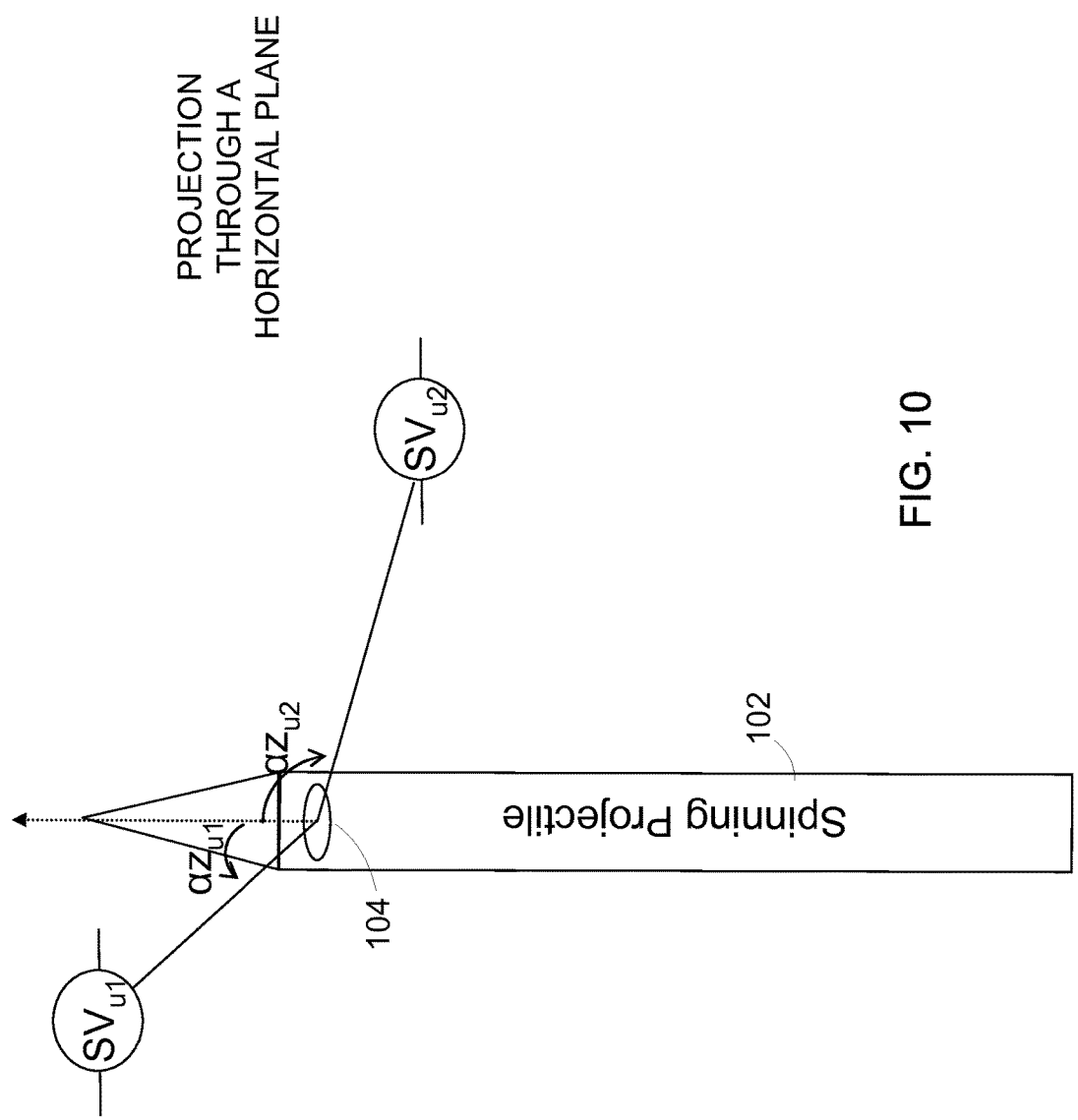
FIG. 10 illustrates an azimuth angle $az_u$.

In FIG. 3, subscript n indicates a particular navigation channel, subscript u indicates a particular upfinder channel, subscript c indicates the set of all channels, $\Delta\phi_u$ indicates phase compensation. LOS data can include, for example, the aspect angle $\alpha_u$ to a u-th space vehicle (see, for example, FIG. 9, SVs projected on the vertical plane through the longitudinal axis of the projectile 102), and the azimuth angle $az_u$ in an up-starboard plane to the u-th upfinder source (see, for example, FIG. 10, SVs projected on a horizontal plane). As illustrated in FIG. 9, the aspect angle $\alpha_u$ is between the longitudinal axis of the u-th space vehicle $SV_u$ (projected rearward to the projectile 102) and the line of sight to the projectile 102 measured from the tail of the u-th space vehicle $SV_u$.

The I and Q data for the positioning processor 350 (subscript n) or for the roll processor 360 (subscript u) corresponds to a correlated in-phase output and a quadrature-phase of the HW correlators 310. In one embodiment, the roll processor 360 is entirely implemented in software/firmware, but can also be implemented in hardware. In the illustrated embodiment, the roll processor 360 tracks each SV in view using a phase-locked loop for each SV, but typically uses less than all the trackable SVs to compute the aggregate up time t_up as will be discussed in greater detail in the following.

An adaptive sideband filter 380 is disposed in a signal path between the HW correlators 310 and a SV power modulation tracking filter 320. In one embodiment, the adaptive sideband filter 380 separately filters the sidebands and a center frequency of the u correlated in-phase signals $I_u$ and correlated quadrature-phase signals $Q_u$ from the HW correlators 310, and generates filtered correlated in-phase output signals (filtered $I_u$) and the filtered correlated quadrature-phase output signals (filtered $Q_u$) as outputs. Preferably, all of the u correlated in-phase signals and correlated quadrature-phase signals are filtered, but less than all of the u correlated in-phase signals and correlated quadrature-phase signals can be filtered. At least one of the filtered correlated in-phase output signals (filtered $I_U$) or the filtered correlated quadrature-phase output signals (filtered $Q_U$) is used to determine the angular orientation of the spinning or rolling object. However, the translational position and velocity of the spinning object can be obtained from tracking of the n correlated in-phase signals $I_n$ and correlated quadrature-phase signals $Q_n$ from the HW correlators 310 and/or associated carriers and not from the filtered correlated in-phase output signals (filtered $I_u$) or the filtered correlated quadrature-phase output signals (filtered $Q_u$).

For example, the received GPS signal (in baseband form), which is provided as an input to the HW correlators 310, can be at about 10.23 Mbps for P(Y) code or at 1.023 Mbit/s for C/A code. The HW correlators 310 themselves integrate samples of the received GPS signal such that the output of the HW correlators 310 is about 1 kHz for each of the u correlated in-phase signals $I_U$ and correlated quadrature-phase signals $Q_U$ from the u tracked space vehicles. The output rate (1 kHz in the illustrated example) of the HW correlators 310 for a particular u-th correlated in-phase signal $I_U$ and correlated quadrature-phase signal $Q_U$ is the center frequency for those signals. However, other integration rates can be used as the center frequency, and the 1 kHz output rate is merely an example. The rolling of the object, such as artillery shell, induces a power modulation, which induces sidebands, which affects the performance of the power modulation tracking by the SV power modulation tracking filter 320 in the presence of interference or jamming. The adaptive sideband filter 380 can improve angular position sensitivity by 4 dB thereby improving operational performance in the presence of interference or jamming.

Figure 11:
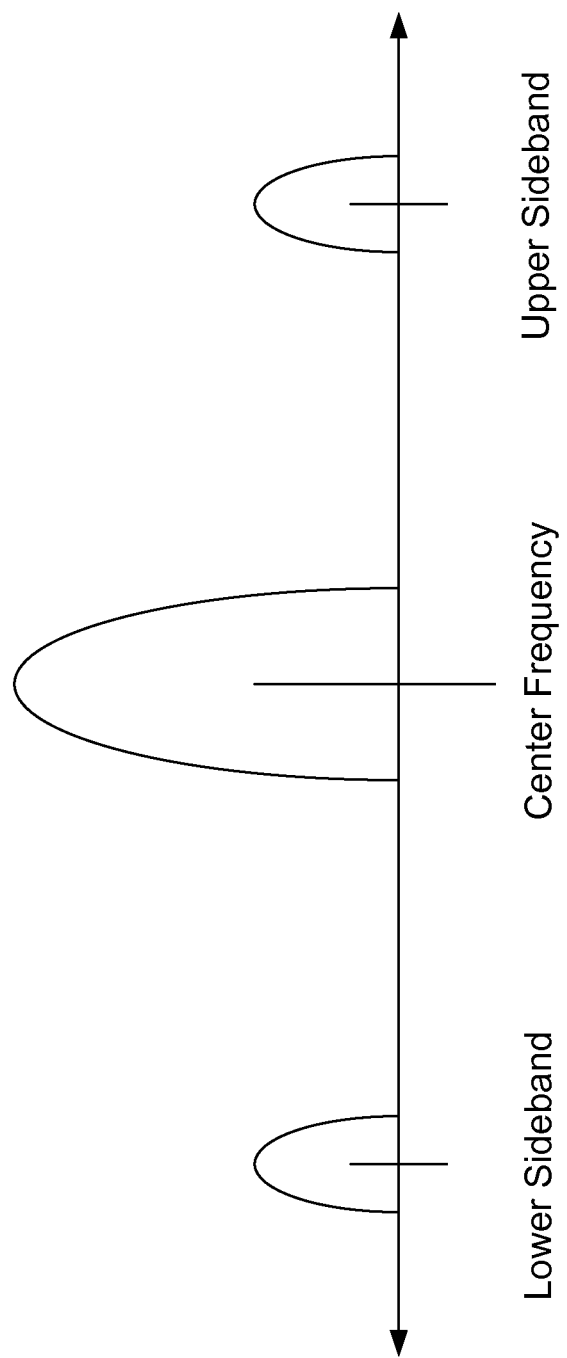
FIG. 11 illustrates an example of a center frequency and sidebands.

The center frequency and lower and upper sidebands are illustrated in FIG. 11. Since the rolling rate of the object can change over time, the sideband frequencies can also change over time. Advantageously, the adaptive sideband filter 380 further filters the center frequency and the lower and upper sidebands separately and adapts to changing sideband frequencies. In the illustrated embodiment, the integration intervals for filtering are 20 ms for a 50 Hz rate, but other intervals and rates can be used. In one embodiment, the adaptive sideband filter 380 is implemented in firmware/software via instructions executing on a processor. Further details of the adaptive sideband filter 380 will be described later in connection with FIGS. 12-14.

The SV power modulation tracking filter 320 incorporates both a frequency-locked loop (FLL) and a phase-locked loop (PLL). A mode/state$_u$ status indicates whether the SV power modulation tracking filter 320 is operating in FLL mode or in PLL mode, and whether or not the loop is locked (for the u-th SV). The mode/state$_u$ information is provided as an input to a measurement enabler 328. Further details of the SV power modulation tracking filter 320 will be described later in connection with FIG. 4. In one embodiment, the SV power modulation tracking filter 320 is implemented by software/firmware. Preferably, each SV in view is tracked by the SV power modulation tracking filter 320.

The SV power modulation tracking filter 320 isolates the power modulation on the I/Q data that is a result of the projectile's spin. The SV power modulation tracking filter 320 phase locks to the amplitude modulation of the GPS signal caused by the projectile's spin. This phase information (angle) is then combined with LOS information from the LOS estimator 306. In the illustrated embodiment, the combination of the phase information and the LOS information is performed in a projectile antenna up estimator 324. In the illustrated embodiment, the LOS information is derived from the position, velocity, and time (PVT) information based on preloaded information from the timer 304 and the initialization data 302, that is, information that is not obtained from GPS signals by the positioning processor 350 during the flight of the projectile 102.

The line-of-sight (LOS) vectors from the LOS estimator 306 are provided as an input to the navigation Kalman filter 314 and to the projectile antenna up estimator 324. In the illustrated embodiment, the LOS vectors used by the navigation Kalman filter 314 are based only on preloaded initialization data 302 (ephemeris and trajectory) and on the time maintained by the timer 304. However, in an alternative embodiment, the LOS vectors can also be computed in a conventional manner.

Aspect angles $\alpha_u$ are provided as an input to the roll compensator 322 and to the measurement enabler 328. The roll compensator 322 is optional. Azimuth angles $az_u$ are provided as an input to the projectile antenna up estimator 324. In an alternative embodiment, the LOS vectors are computed in another manner, such as the conventional practice of determining the position of the GPS receiver 210 via GPS signal tracking and determining the position of a space vehicle from received ephemeris data.

As the projectile 102 (FIG. 1) spins during flight, the pattern of the antenna 104 (FIG. 1) will at times point toward a SV and at times away from the SV. This rotation induces a power modulation on the received GPS signal that is detectable as an amplitude modulation having a modulation rate (frequency) that is the same as the spin of the projectile 102. In the illustrated embodiment, the SV power modulation tracking filter 320 only phase locks to the amplitude modulation (due to rotation) of a GPS signal from a SV and does not monitor phase modulation (due to rotation). Typically, the lobes of the antenna 104 point outwards from the projectile 102. Preferably, the antenna 104 is configured such that its main lobe points normal to the flight trajectory; however, it will be understood that depending on the angle that a particular SV has with respect to the projectile 102, it may not be the main lobe that has the strongest overall power. In addition, it should be noted that it can be difficult to detect the amplitude modulation of the GPS signal when a SV is too far in the direction of the nose or the tail of the projectile 102, for example, directly in front of or behind the projectile 102. In one embodiment, SVs that make an angle within 45 degrees of the nose or 50 degrees from the tail are not used for up determination, that is, are not part of the "u" set of SVs, and an up time t_up$_u$ for those SVs is not computed. However, these SVs may still be used for obtaining positioning information, that is, may be used as one of the "n" set of SVs.

The roll compensator 322 receives the aspect angle $\alpha_u$ as an input, and generates phase compensation $\Delta\phi_u$ as an output. The phase compensation $\Delta\phi_u$ provides a correction factor used by the projectile antenna up estimator 324 to compensate for the antenna pattern. In one embodiment, the roll compensator 322 is implemented with a lookup table (LUT). In one embodiment, the roll compensator 322 is optional. For example, if the antenna pattern gain and phase is relatively symmetric over +/−180 degrees, then the roll compensator 322 can be omitted. In one embodiment, the roll compensator 302 further receives an estimate of the expected roll rate (not shown) from the initialization data 302 and the computed roll rate $\phi'_u$ from the SV power modulation tracking filter 320 as a check of the computed roll rate $\phi'_u$. The expected roll rate typically varies over the intended trajectory. If the expected roll rate and the computed roll rate $\phi'_u$ do not agree to within a threshold, then the computed roll rate $\phi'_u$ can be determined to be untrustworthy, and the roll and roll rate estimate for the particular SV can be discarded as invalid. For example, the threshold can be predetermined, such as a threshold of +/−20 Hz.

In one embodiment, the projectile antenna up estimator 324 is a Kalman filter. The Kalman filter smoothes the up estimate for each SV tracked. The projectile antenna up estimator 324 uses the amplitude modulation information from the SV power modulation tracking filter 320, the direction of the spin sgn(r') (either 1 or −1), and the phase compensation $\Delta\phi_u$ to generate an estimate of the u-th SV's angular position, angular velocity, and angular acceleration relative to the projectile 102. This information is summarized in vector x. In one embodiment, the projectile antenna up estimator 324 is implemented in software/firmware. In the illustrated embodiment, the projectile antenna up estimator 324 performs the computations expressed in Equations 1 and 2. Equation 1 describes a roll estimate vector x describing rotation with respect to a particular u-th SV. The components of the roll estimate vector x include phase or angle r, angular velocity r', and angular acceleration r''. In the illustrated embodiment, the phase or angle r is referenced to the particular u-th SV, with 0 angle being with the antenna 104 (FIG. 1) pointing towards the u-th SV.

$$x = \begin{bmatrix} r \\ r' \\ r'' \end{bmatrix}_u = \begin{bmatrix} az - (\phi + \Delta\phi)\text{sgn}(r') \\ \phi'\text{sgn}(r') \\ \phi''\text{sgn}(r') \end{bmatrix}_u \quad \text{Eq. 1}$$

Equation 2 illustrates a covariance matrix R for a Kalman filter for the noise estimated by the FLL/PLLs.

$$R_u = \begin{bmatrix} \sigma_\phi^2 & 0 & 0 \\ 0 & \sigma_{\phi'}^2 & 0 \\ 0 & 0 & \sigma_{\phi''}^2 \end{bmatrix}_u \quad \text{Eq. 2}$$

The measurement enabler 328 controls a measurement window 326 for monitoring the roll estimate vector x output of the projectile antenna up estimator 324. In the illustrated embodiment, the measurement window 326 is open for a measurement associated with a u-th SV when the following conditions are true: (a) the SV power modulation tracking filter 320 is in PLL mode; (b) the PLL is locked; and (c) aspect angle $az_u$ to the u-th SV is between 45 degrees and 135 degrees. Other applicable aspect angles will be readily determined by one of ordinary skill in the art and can depend on the antenna pattern. Beyond the selected range for the aspect angle $az_u$, the amount of amplitude modulation caused by the spinning of the projectile 102 is deemed to be relatively small. Thus, while the SV power modulation tracking filter 320 preferably tracks all the SVs in view, the operation of the measurement window 326 limits the SVs used to generate the aggregate up time t_up to a smaller subset. The SVs in the smaller subset can change over time as the projectile 102 travels and its aspect angle changes. The measurement window 326 can be embodied in software/firmware by, for example, inspecting a limited range of data.

A current roll estimate generator 330 generates a current roll estimate vector $x_{curr}$ based on the current time $t_{curr}$, the roll estimate vector x, and a previous up time $t_u$, that is, when the antenna 104 was last pointing at the u-th SV. The foregoing data is combined with a transition matrix φ (see Eq. 3). The current roll estimate vector $x_{curr}$ has the same dimensions as the roll estimate vector x of Equation 1. The current roll estimate vector $x_{curr}$ can include an estimate of the angle r, angular velocity r', and optionally an angular acceleration r'' of the antenna 104 relative to the SV for the current time $t_{curr}$. In one embodiment, the current roll estimate generator 330 is embodied by software/firmware.

$$\Phi = \begin{bmatrix} 1 & \Delta t & \frac{1}{2}\Delta t^2 \\ 0 & 1 & \Delta t \\ 0 & 0 & 1 \end{bmatrix} \quad \text{Eq. 3}$$

The next up time estimator 332 determines an estimate (in time) of the next time that the pattern of the antenna 104 will be pointing toward the u-th SV. The information can be computed as illustrated within next up time estimator 332 based on the current time $t_{curr}$ and the angle (r) and the angular velocity (r') of the current information vector $x_{curr}$. A particular up time output of next up time estimator 332 corresponds to the next up time $t\_up_u$ for the u-th upfinder channel.

The various next up times $t\_up_u$ are then aggregated to form the next up time t_up for the projectile 102 as a whole. For example, as discussed earlier in connection with FIG. 1, the aggregated next up time t_up can be formed by calculating an average of the next up times from the set of up times for the u SVs.

Figure 4:
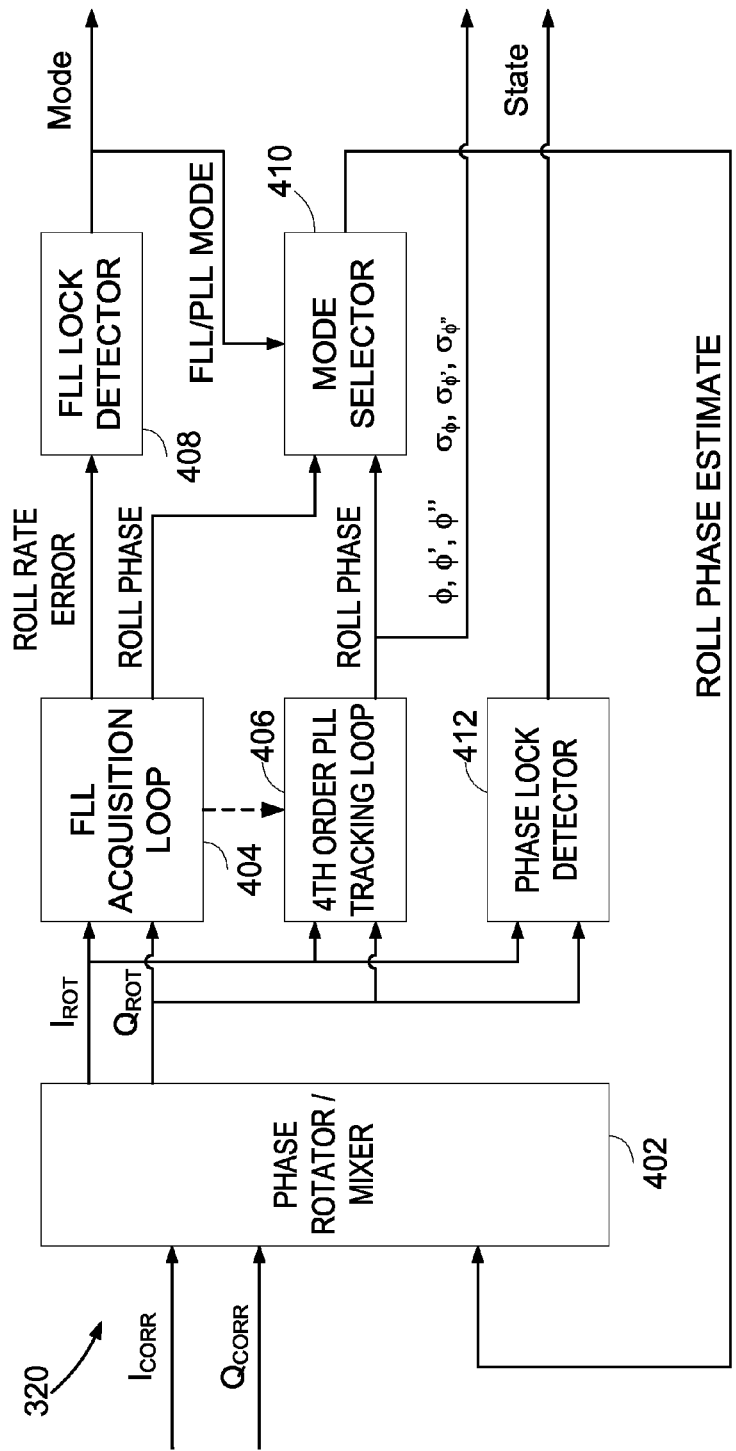
FIG. 4 illustrates an embodiment of a SV power modulation tracking filter according to an embodiment of the invention.

FIG. 4 illustrates an embodiment of the SV power modulation tracking filter 320 according to an embodiment of the invention. The SV power modulation tracking filter 320 includes a phase rotator/mixer 402, a frequency-locked loop (FLL) acquisition loop 404, a 4th-order phase-locked loop (PLL) tracking loop 406, an FLL lock detector 408, a mode selector 410, and a phase lock detector 412. There should be a separate SV power modulation tracking filter 320 for each SV that is tracked. In one embodiment, there are at least 12 separate SV power modulation tracking filters 320. When implemented in software/firmware, the same routine can be used for each SV that is tracked. When implemented in hardware, preferably, each of the SV power modulation tracking filters 320 is identical to each other. However, when implemented in hardware, some components, such as the FLL acquisition loop 404, the FLL lock detector 408 or selected components thereof, can be shared among two or more SV power modulation tracking filters 320. For example, after phase locking by the PLL tracking loop 406, the FLL components are typically not used in operation, and can be used for acquisition to a different SV. In addition, the roll frequency of the projectile 102 is caused by the rolling of the projectile 102 itself, and thus, the power modulation should have the same frequency (the roll frequency) among the various SVs. Thus, a FLL acquisition loop 404 for one SV can be used for pulling in a PLL tracking loop 406 for another. When implemented in software/firmware, the routine implementing the FLL would not need to be called after the PLL tracking loop 406 is locked.

Figure 7:
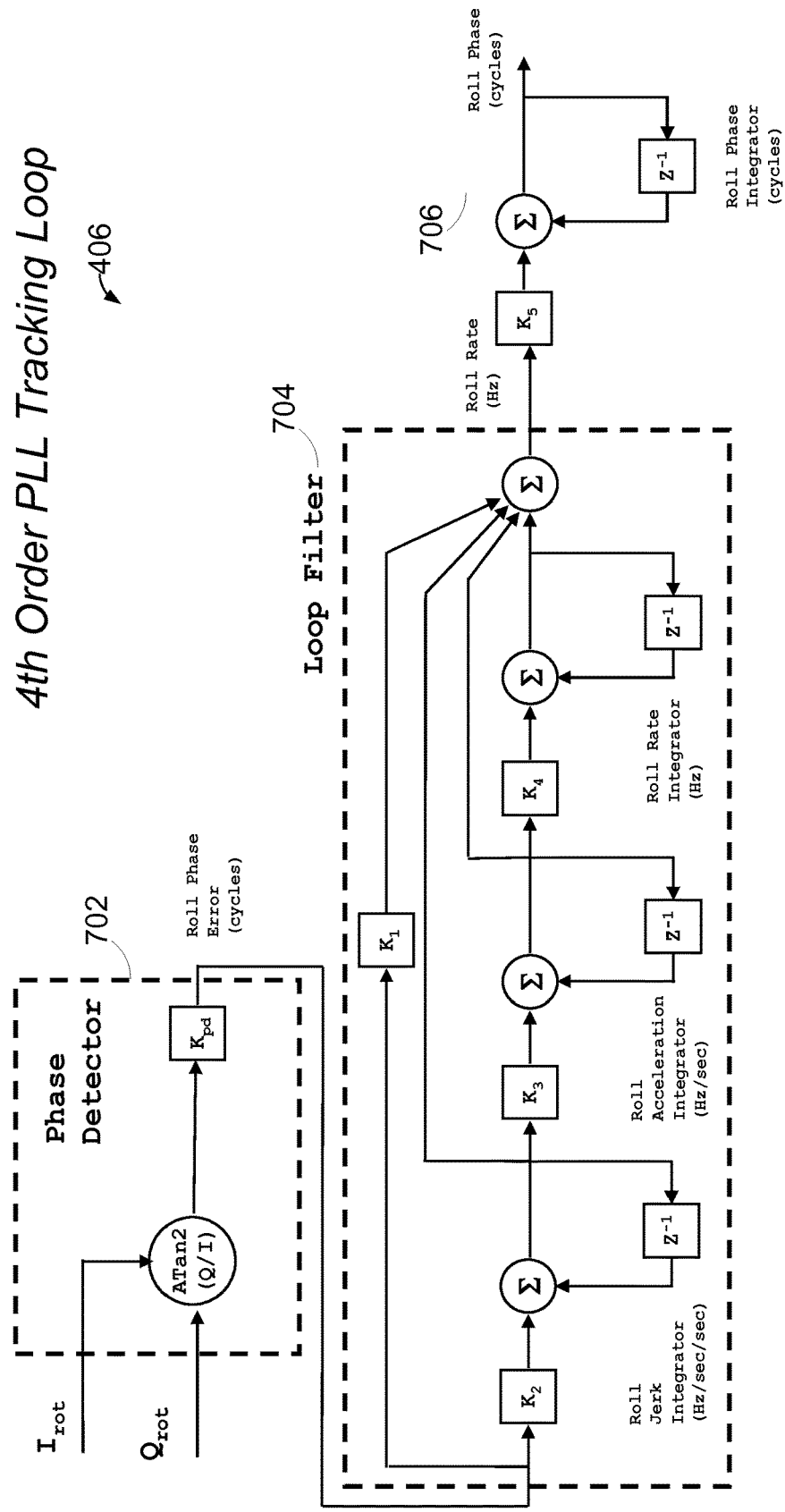
FIG. 7 illustrates an embodiment of a 4th order phase-locked loop (PLL) SV modulation tracking loop.

In the illustrated embodiment, outputs of the 4th-order PLL tracking loop 406 include roll phase $\phi_u$, roll rate $\phi'_u$, roll acceleration $\phi''_u$, which are available from the loop filter 704 (FIG. 7). In one embodiment, standard deviations of each are also computed and depicted as $\sigma_{\phi u}$, $\sigma_{\phi' u}$, $\sigma_{\phi'' u}$.

One embodiment of the phase rotator/mixer 402 will be described in greater detail later in connection with FIG. 5. One embodiment of the frequency-locked loop (FLL) acquisition loop 404 will be described in greater detail later in connection with FIG. 6. One embodiment of the 4th-order phase-locked loop (PLL) tracking loop 406 will be described in greater detail later in connection with FIG. 7.

The phase rotator/mixer 402 utilizes mixers to phase rotate the input $I_{CORR}$ and $Q_{CORR}$ to generate $I_{ROT}$ and $Q_{ROT}$ as outputs. The $I_{CORR}$ and the $Q_{CORR}$ signals correspond to the particular $I_U$ and $Q_U$ signals for the u-th SV. The phase rotation is controlled by the roll phase estimate. The FLL acquisition loop 404 determines the roll rate (frequency) to assist the PLL tracking loop 406 to pull in to achieve phase lock. After the PLL tracking loop 406 achieves phase lock, then the PLL tracking loop 406 is used to track the roll of the projectile 102. The FLL lock detector 408 is used for acquisition of the signal modulation and generates a roll rate error (frequency). Based on the roll rate error from the FLL lock detector 408 and the pull-in range of the PLL tracking loop 406, the mode selector 410 selects between the FLL acquisition loop 404 or the PLL tracking loop 406. The phase lock detector 412 determines whether or not PLL tracking loop 406 is phase locked.

Figure 5:
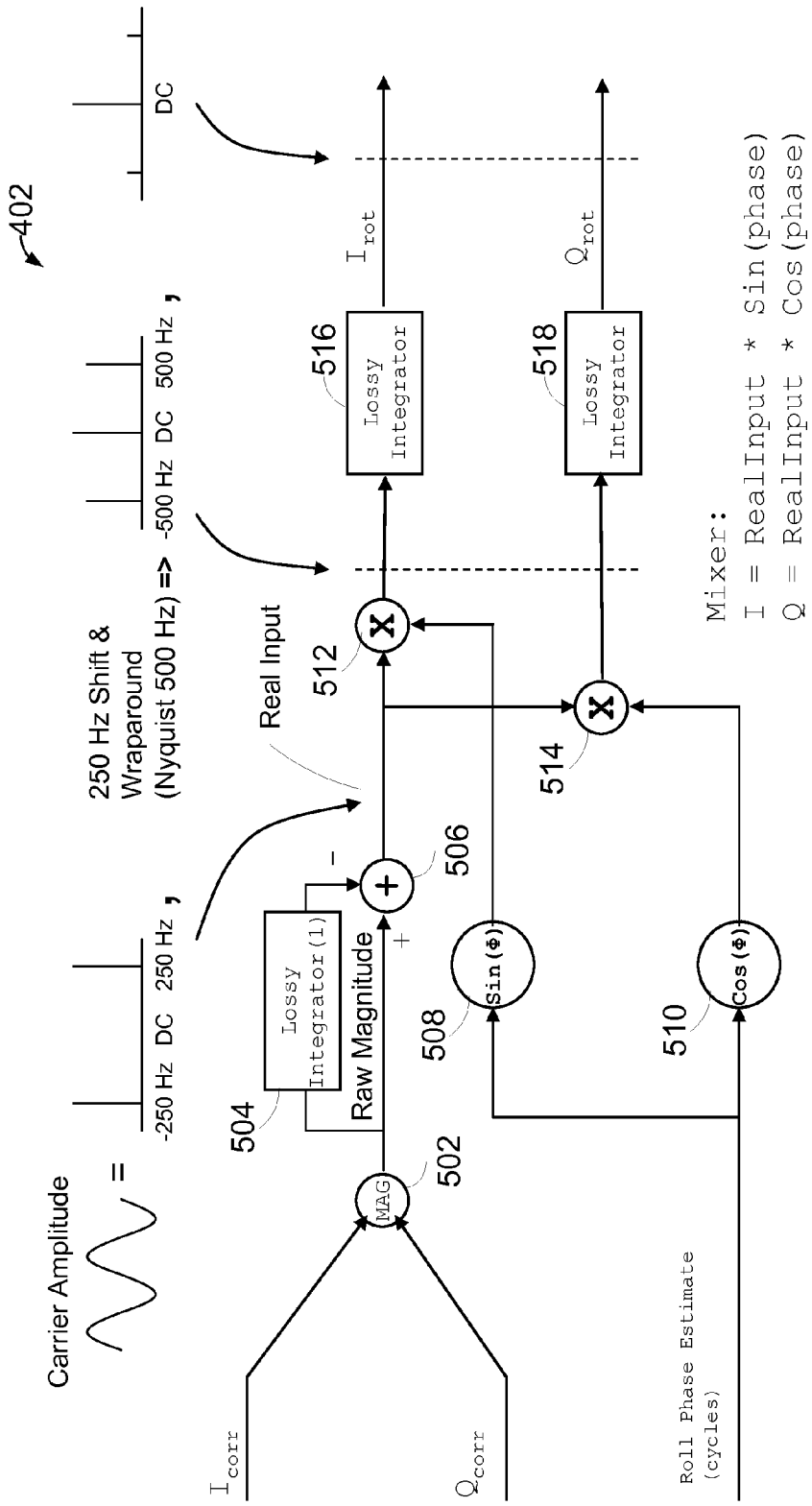
FIG. 5 illustrates a phase rotator/mixer.

FIG. 5 illustrates one embodiment of the phase rotator/mixer 402. In the illustrated embodiment, the phase rotator/mixer 402 is embodied in software/firmware. However, the phase rotator/mixer 402 can alternatively be embodied in hardware. The spin of the projectile 102 causes a power modulation on the received GPS signals. When the main lobe of the antenna (assuming a symmetrical antenna pattern) of the projectile 102 faces a particular SV, then maximum power for the received GPS signal is received. When the antenna faces away from the SV, minimum power is received. This power modulation is similar to a sine wave over time, and the PLL tracking loop 406 tracks the phase of that amplitude modulated pattern.

The phase rotator/mixer 402 includes a magnituder 502, a magnitude lossy integrator 504, a summer 506, a sine function block 508, a cosine function block 510, an I-phase mixer 512, a Q-phase mixer 514, an I-phase lossy integrator 516, a Q-phase lossy integrator 518.

The magnituder 502 generates a raw magnitude signal that has the magnitude of the $I_{CORR}$ and $Q_{CORR}$ signals. The magnitude lossy integrator 504 is a low-pass filter. In one embodiment, the time constant of the magnitude lossy integrator 504 is about 128 milliseconds. The time constant should be relatively long relative to the spin interval of the projectile 102, which is typically around 4 milliseconds, but varies within a wide range. The time constant can vary in a very broad range and other applicable time constants will be readily determined by one of ordinary skill in the art. The output of the magnitude lossy integrator 504 contains the DC component of the raw magnitude signal, and the DC component is subtracted from the raw magnitude signal by the summer 506 to generate a signal referred to as a real input signal.

A sine and cosine of a roll phase estimate are generated by the sine function block 508 and by the cosine function block 510, respectively. The sine function block 508 and the cosine function block 510 can be implemented by, for example, a lookup table or by a function call. When the SV power modulation tracking filter 320 is phase locked, the sine and cosine of the roll phase estimate are phase-locked to the reference inputs $I_{CORR}$ and $Q_{CORR}$. In one embodiment, the roll phase estimate is an output of the mode selector 410 (FIG. 4). The I-phase mixer 512 and to the Q-phase mixer 514 form a phase detector. The sine and cosine of the roll phase estimate are provided as inputs to the I-phase mixer 512 and to the Q-phase mixer 514, respectively, which mixes the sine and cosine with the real input signal for phase detection. The outputs of the I-phase mixer 512 and to the Q-phase mixer 514 represents a difference in phase between the reference inputs $I_{CORR}$ and $Q_{CORR}$ and the sine and cosine of the roll phase estimate. The outputs of the I-phase mixer 512 and the Q-phase mixer 514, respectively, are provided as inputs to the I-phase lossy integrator 516 and to the Q-phase lossy integrator 518, respectively.

The I-phase lossy integrator 516 and the Q-phase lossy integrator 518 are low-pass filters that remove sidebands from the outputs of the I-phase mixer 512 and the Q-phase mixer 514, respectively, to generate the outputs $I_{ROT}$ and $Q_{ROT}$ of the phase rotator/mixer 402. The I-phase lossy integrator 516 and the Q-phase lossy integrator 518 form a complex low pass filter. In the illustrated embodiment, the 2-sided bandwidth (2BW) point is 100 Hertz (50 Hz each). Other applicable bandwidth specifications are applicable and will be readily determined by one of ordinary skill in the art. However, it should be noted that the 2-sided bandwidth for the complex low-pass filter formed by the I-phase lossy integrator 516 and the Q-phase lossy integrator 518 should be much wider than the 2-sided bandwidth for the loop.

Figure 6:
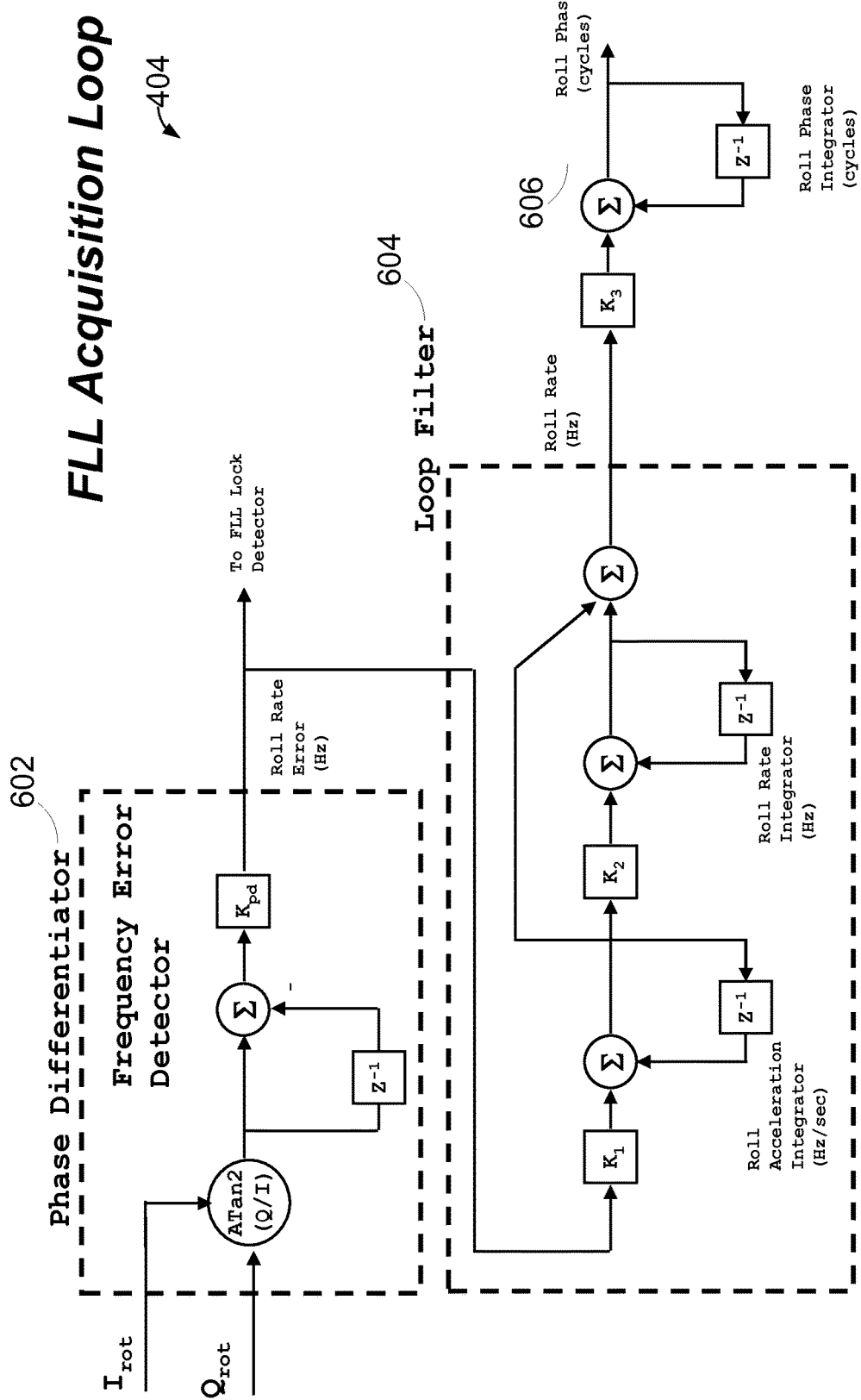
FIG. 6 illustrates an embodiment of a frequency-locked loop (FLL) acquisition loop.

FIG. 6 illustrates an embodiment of the FLL acquisition loop 404. The FLL acquisition loop 404 includes a phase differentiator 602, a loop filter 604, and a roll-phase integrator 606. The phase differentiator 602 generates a roll rate error as an output. The roll rate error output of the phase differentiator 602 is provided as an input to the FLL lock detector 408 (FIG. 4) and as an input to the loop filter 604. In the illustrated embodiment, the loop filter 604 has a roll acceleration integrator and a roll rate integrator. An output of the loop filter 604 is provided as an input to the roll phase integrator 606, which generates a roll phase as an output. The FLL acquisition loop 404 assists the PLL tracking loop 406 (FIG. 4) to achieve phase lock. For example, the PLL tracking loop 406 is typically unable to acquire phase lock to the reference inputs $I_{CORR}$ and $Q_{CORR}$ unless the frequency error or roll rate error is within a certain range, typically a few hertz for the illustrated embodiment of the PLL tracking loop 406. After the PLL tracking loop 406 is locked, the operation of the FLL acquisition loop 404 is typically not needed.

The FLL lock detector 408 (FIG. 4) senses when the roll rate error is within the pull-in range of the PLL tracking loop 406. In one embodiment, the FLL lock detector 408 is configured to receive the roll rate error as an input to a lossy integrator to generate a filtered roll rate error, to take the absolute value of the integrated roll rate error, to compare the integrated roll rate error to a threshold, such as a few hertz, and then to determine that the FLL acquisition loop 404 is locked if the roll rate is below the threshold and unlocked if otherwise. The state of locked/unlocked can be used to determine whether or not the roll rate error is within the pull-in range of the PLL tracking loop 406.

FIG. 7 illustrates an embodiment of the PLL tracking loop 406 implemented as a 4-th order PLL tracking loop. The PLL tracking loop 406 has a phase detector 702, a loop filter 704, and a roll-phase integrator 706. A roll phase error output of the phase detector 702 is provided as an input to the loop filter 704. A roll rate output of the loop filter 704 is provided as an input to the roll-phase integrator 706, which generates a roll phase output in cycles. The phase lock detector 412 (FIG. 4) detects when the PLL tracking loop 406 is phase locked to the reference inputs $I_{CORR}$ and $Q_{CORR}$.

In one embodiment, the phase lock detector 412 is configured to low-pass filter the $I_{ROT}$ and $Q_{ROT}$ outputs of the phase rotator/mixer 402 with lossy integrators. The bandwidth of these lossy integrators should be less than the bandwidth of the PLL tracking loop 406. While phase locked, most of the power should be in the filtered $I_{ROT}$ signal and relatively little should be in the filtered $Q_{ROT}$ signal. This relationship can be used to determine whether the PLL tracking loop 406 is locked. In one embodiment, the phase lock detector 412 is configured to take the absolute value of the filtered $Q_{ROT}$ signal, and then multiply the filtered $Q_{ROT}$ signal by a lock threshold value. In one embodiment, the lock threshold value is around 1.5. However, the lock threshold value can vary in a relatively broad range and other applicable values will be readily determined by one of ordinary skill in the art. The multiplied and filtered $Q_{ROT}$ signal is then compared with the filtered $I_{ROT}$ signal. In one embodiment, if the multiplied and filtered $Q_{ROT}$ signal is less than the filtered $I_{ROT}$ signal, then the phase lock detector 412 determines that the PLL tracking loop 406 is locked. Otherwise, the phase lock detector 412 determines that the PLL tracking loop 406 is unlocked. The status mode/state$_u$ can be provided as an input to the measurement enabler 328.

Figure 8:
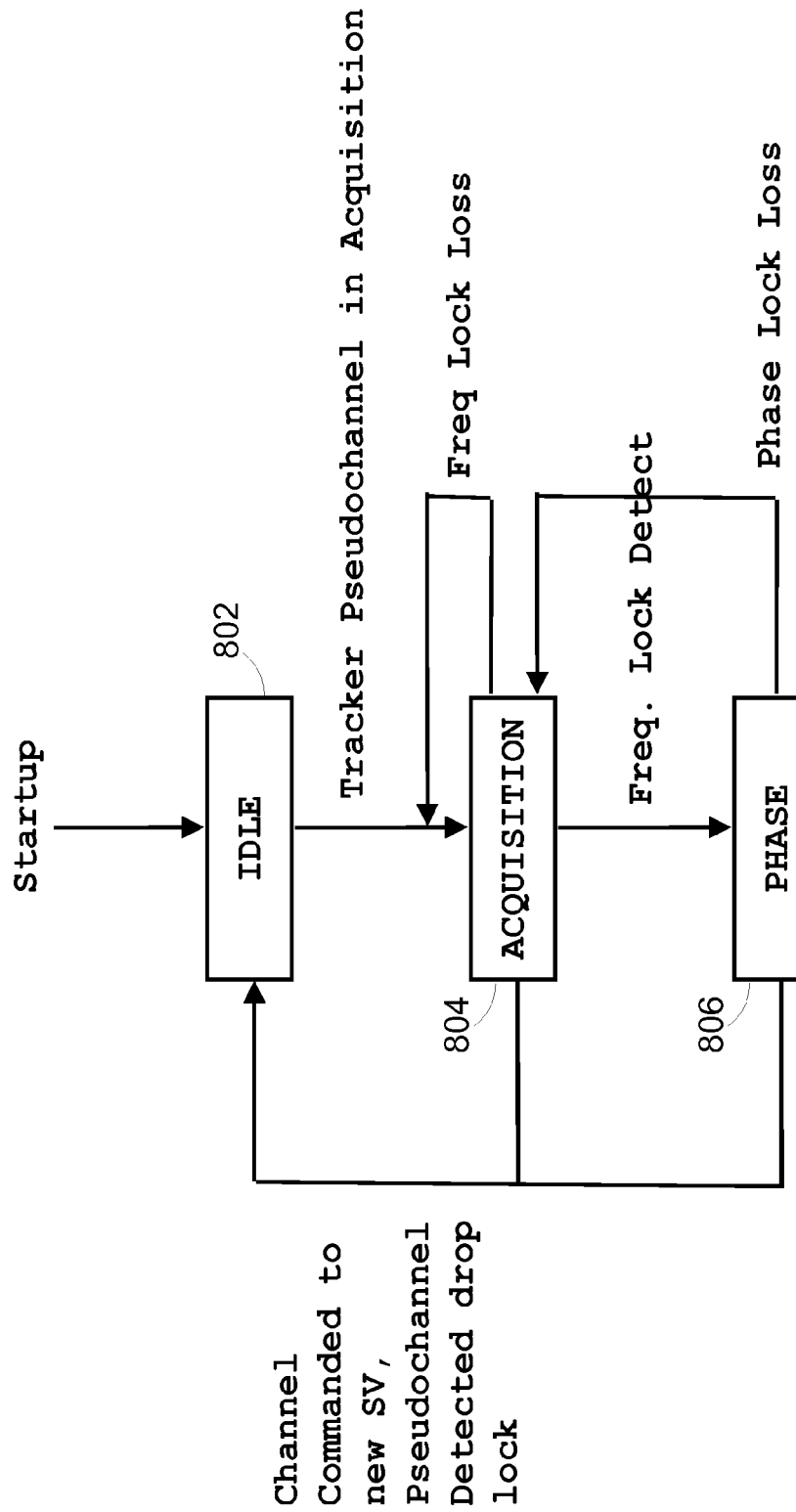
FIG. 8 illustrates a process showing state transitions for GPS-based "up" estimation.

FIG. 8 illustrates a process showing state transitions for GPS-based "up" estimation for control of the FLL acquisition loop 404 and PLL tracking loop 406. The illustrated process can be used with either a software/firmware implementation or a hardware implementation. In the illustrated embodiment, software/firmware is used.

The process begins in an idle state 802. When commanded to track the rotation relative to a previously untracked SV, the process proceeds to an acquisition state 804 to phase lock to the SV. The process begins by closing the feedback loop of the SV power modulation tracking filter 320 (FIG. 3) around the FLL acquisition loop 404 (FIG. 4). The process stays in the acquisition state 804 until the frequency error is within the pull-in range of the PLL tracking loop 406 (FIG. 4).

When the frequency error is within the pull-in range of the PLL tracking loop 406, the process advances to a phase state 806, in which the PLL tracking loop 406 phase locks to the spin modulation on the signal from the SV. The process stays in the phase state 806 unless a new SV is commanded to be tracked, in which case, the process returns from the phase state 806 to the idle state 802, or if a loss of phase lock is detected, in which case, the process returns from the phase state 806 to the acquisition state 804.

Figure 12:
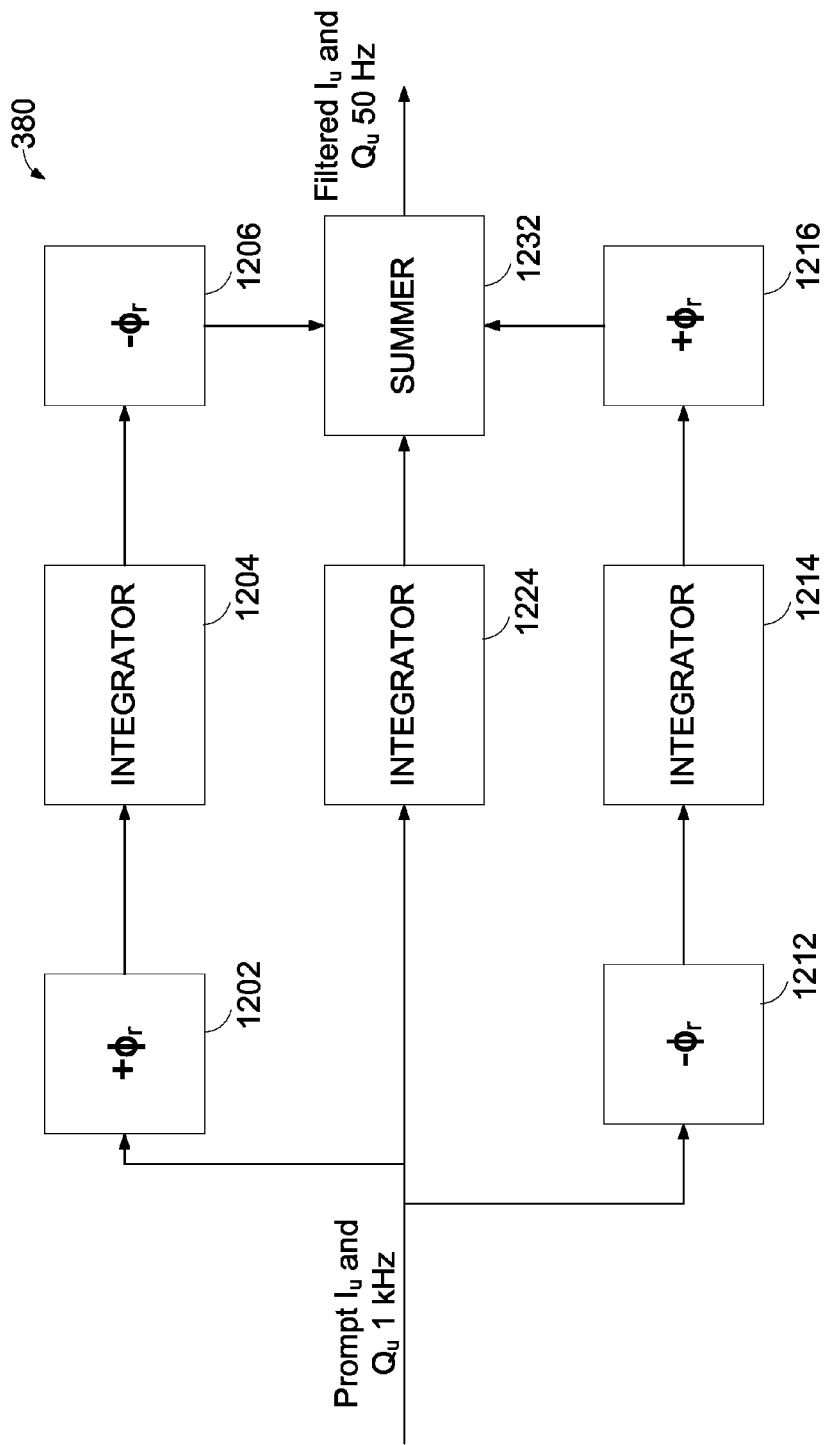
FIG. 12 illustrates an example of an adaptive sideband filter.

FIG. 12 illustrates further details of one example of an adaptive sideband filter 380. The adaptive sideband filter 380 can be implemented in hardware or in software/firmware or via a combination of both hardware and software/firmware. The adaptive sideband filter 380 filters the correlated in-phase signal $I_U$ and correlated quadrature-phase signal $Q_U$ in 3 separate paths. In the illustrated embodiments, each of the paths includes a low-pass filter and operate via integration. In alternative embodiments, the low-pass filter can be implemented by other techniques, such as, but not limited to, finite impulse response filtering, infinite impulse response filtering, fast Fourier transform (FFT) filtering, or the like. It will be understood that each of the u pairs of correlated in-phase signals $I_U$ and correlated quadrature-phase signals $Q_U$ are separately filtered, but that due to rolling, the correlated in-phase signal $I_U$ and the correlated quadrature-phase signal $Q_U$ from a particular space vehicle can be filtered together in the sideband paths. For the purposes of example, a sample period of 1 millisecond between samples of the correlated in-phase signal $I_U$ and correlated quadrature-phase signal $Q_U$ and an integration period of 20 milliseconds will be used. However, other sample periods and integration periods will be applicable.

A first path includes a first positive phase rotator 1202, a first integrator 1204, and a first negative phase rotator 1206. A second path includes a second negative phase rotator 1212, a second integrator 1214, and a second positive phase rotator 1216. A third path includes a third integrator 1224. The first path filters the upper sideband, the second path filters the lower sideband, and the third path filters the center frequency. A summer 1232 combines the results of the filtering from the first path, the second path, and the third path to generate the filtered correlated in-phase signal (filtered $I_u$) and the filtered correlated quadrature-phase signal (filtered $Q_u$). The phase rotators 1202, 1206, 1212, 1216 can be implemented by the phase rotator described later in connection with FIG. 14.

The adaptive sideband filter 380 can be economically implemented in software/firmware. The applicable software/firmware routine can be executed in a near continuous manner for each sample period, for example, every millisecond, or in a batch process-like manner for each integration period, for example, every 20 milliseconds, or some interval in-between.

The first positive phase rotator 1202 positively phase rotates samples of the correlated in-phase signal and the correlated quadrature-phase signal by an amount per sample to generate a positively phase-rotated in-phase signal and a positively phase-rotated quadrature-phase signal, respectively. The amount per sample is related to an amount of rotation of the spinning object between a start of an integration period and a start of a sample period of the particular sample. For example, the amount of phase rotation can correspond to the amount by which the spinning object rolls during a sample period, which can be 1 millisecond (ms), for example. Advantageously, the amount of phase rotation provided by the first positive phase rotator 1202 can be adaptively varied based on the spin rate of the object.

For example, with reference to a 1 ms sample period and 20 ms integration period, there are 20 samples per integration period. For example, the first sample of an integration period does not need to be rotated by the first positive phase rotator 1202. The second sample is rotated by an amount corresponding to 1 ms of rolling of the object. The third sample is rotated by an amount corresponding to 2 ms of rolling of the object, and so on. The 20th sample is rotated by an amount corresponding to 19 ms of rolling of the object.

The second negative phase rotator 1212 operates in a similar but opposite manner to the first positive phase rotator 1202. The second negative phase rotator 1212 negatively phase rotates samples of the correlated in-phase signal and the correlated quadrature-phase signal by the same amount per sample, but in the negative direction, to generate a negatively phase-rotated in-phase signal and a negatively phase-rotated quadrature-phase signal, respectively. Advantageously, the amount of phase rotation provided by the second negative phase rotator 1212 can be adaptively varied based on the spin rate of the object.

Over an integration period, the first integrator 1204 integrates the samples of the positively phase-rotated in-phase signal and the positively phase-rotated quadrature-phase signal. Similarly, the second integrator 1214 integrates the samples of the negatively phase-rotated in-phase signal and the negatively phase-rotated quadrature-phase signal during the integration period. The third integrator 1224 integrates the samples of the correlated in-phase signal $I_u$ and the correlated quadrature-phase signal $Q_u$.

The integrators 1204, 1214, 1224 should integrate over the same period. At the beginning of an integration period, each of the integrators 1204, 1214, 1224 can be reset to zero such that the integrators 1204, 1214, 1224 can correspond to integrate and dump integrators. In addition, each of the integrators 1204, 1214, 1224 should perform integration in a coherent manner such that the in-phase or I components are added separately from the quadrature or Q components.

At the end of the integration periods, the first integrator 1204 generates first raw complex integration results as an output, the second integrator 1214 generates second raw complex integration results as an output, and the third integrator 1224 generates third raw complex integration results as an output.

In one embodiment, the integration period is 20 milliseconds and coincides with a symbol period for a GPS navigation message. Other periods can be used as will be readily determined by one of ordinary skill in the art. However, the integration period should be longer than the sample period of the correlated in-phase signal $I_u$ and correlated quadrature-phase signal $Q_u$, which in this example is 1 millisecond, and in the GPS context, should be no longer than 20 milliseconds, which is the symbol period for the GPS navigation message. The integration period should not cross symbol boundaries.

At the end of the integration period, the integration results from the first integrator 1204 are provided as an input to the first negative phase rotator 1206, and the integration results from the second integrator 1214 are provided as an input to the second positive phase rotator 1216. The first negative phase rotator 1206 negatively phase rotates the first raw complex integration results by an angle corresponding to the total amount of rotation of the spinning object from the start of the first sample of the integration period to the start of the last sample of the integration period to generate first complex integration results. For example, the angle can correspond to 19 ms of rotation for a 20 ms integration period with 1 ms between samples. Similarly, the second positive phase rotator 1216 positively phase rotates the first raw complex integration results by the same angle, but in the positive phase direction, to generate second complex integration results. The first negative phase rotator 1206 and the second positive phase rotator 1216 can be considered to be de-rotators.

The first complex integration results from the first negative phase rotator 1206, the second complex integration results from the second positive phase rotator 1216, and the third raw integration results from the third integrator 1224 are then combined by the summer 1232 to generate a sample for the filtered correlated in-phase signal and the filtered correlated quadrature-phase signal at the end of each integration period. In the illustrated embodiment, the integration results are simply added by the summer 1232. However, in alternative embodiments, scaling can be used such that the integration results are not necessarily equally weighted.

Figure 13:
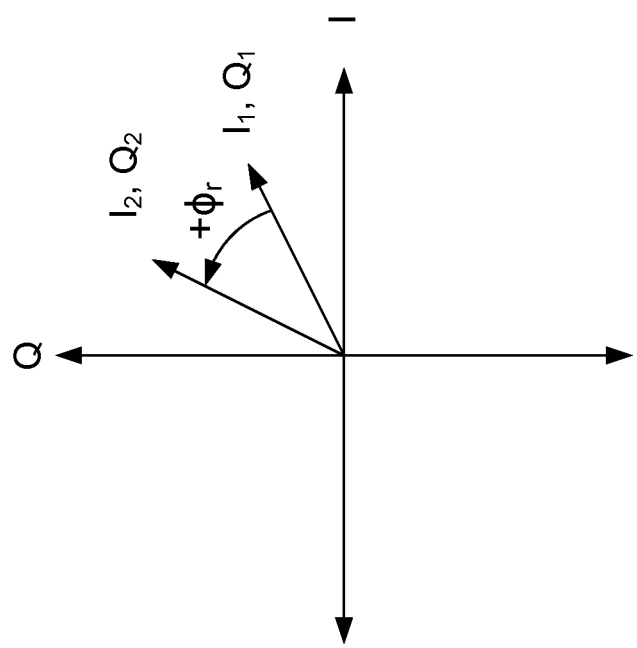
FIG. 13 illustrates a graphical example of phase rotation.

FIG. 13 illustrates an example of a positive phase rotation of a complex sample. Each complex sample can be represented as an in-phase (I) component expressed along a horizontal axis and a quadrature-phase (Q) component expressed along a vertical axis. In the example, a first sample at point $(I_1, Q_1)$ is phase rotated to generate a second sample at point $(I_2, Q_2)$. The same points can also be expressed in polar coordinates via a magnitude and an angle.

Equations 4-7 describe the mathematical operations that can be performed by electronic hardware or by software/firmware instructions executed by a processor for the phase rotation of the complex sample. Equations 4 and 5 illustrate the conversion for the point $(I_1, Q_1)$ from Cartesian coordinate form to polar coordinate form $(r, \alpha)$.

$$r = \sqrt{(I_1)^2 + (Q_1)^2} \qquad \text{Eq. 4}$$

$$\alpha = \tan^{-1}\left(\frac{Q_1}{I_1}\right) \qquad \text{Eq. 5}$$

The amount of rotation $\phi_r$ is added to the original angle $\alpha$ for positive phase rotation, and the rotated point $(I_2, Q_2)$ is converted back to normal Cartesian coordinate form as shown in Equations 6 and 7. Positive phase rotation is performed by adding $\phi_r$ to $\alpha$ as shown in FIG. 13 and Equations 6 and 7.

$$I_2 = r \cos(\alpha + \phi_r) \qquad \text{Eq. 6}$$

$$Q_2 = r \sin(\alpha + \phi_r) \qquad \text{Eq. 7}$$

Negative phase rotation is performed by subtracting $\phi_r$ from $\alpha$ as shown in Equations 8 and 9.

$$I_2 = r \cos(\alpha - \phi_r) \qquad \text{Eq. 8}$$

$$Q_2 = r \sin(\alpha - \phi_r) \qquad \text{Eq. 9}$$

Figure 14:
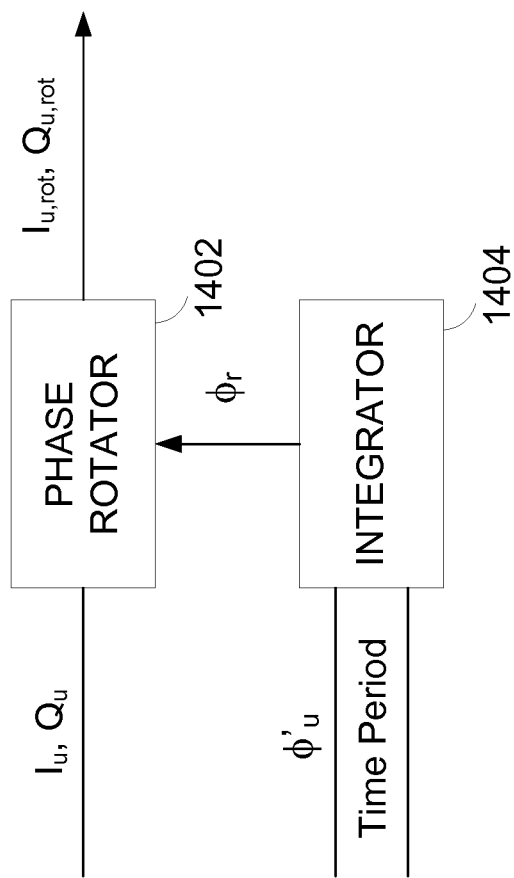
FIG. 14 illustrates a phase rotator and an integrator.

FIG. 14 illustrates one embodiment of a phase rotator 1402 and an integrator 1404. The integrator 1404 integrates a computed roll rate $\phi'_u$ from the SV power modulation tracking filter 320 (FIG. 3) over a selected time period. For example, the time period can be the time period between a start of an integration period and a start of a sample period for generation of angles for the first positive phase rotator 1202 and the second negative phase rotator 1212, or the time period from the start of the first sample of the integration period to the start of the last sample of the integration period for the first negative phase rotator 1206 and the second positive phase rotator 1216.

The computed roll rate $\phi'_u$ can vary over time as, for example, an artillery shell's spin rate can slow down during flight. However, in certain embodiments, the computed roll rate $\phi'_u$ can be considered to be a constant over relatively short intervals of time, such as over 20 ms intervals. Nonetheless, the actual roll rate is not a constant, but varies, and by tracking the actual roll rate with the computed roll rate $\phi'_u$ the sideband filters can be adaptively adjusted. In one embodiment, the integrator 1404 can be substituted by a multiplier performing multiplication of the computed roll rate $\phi'_u$ by the applicable time period. The results of the integration or multiplication corresponds to the angle $\phi_r$ by which the I and Q signal sample is to be rotated. In addition, while illustrated with separate roll rates $\phi'_u$ for the u sets of signals from the u space vehicle signals, the roll rates should be the same for all the signals, so that a composite or averaged roll rate can alternatively be used.

Various embodiments have been described above. Although described with reference to these specific embodiments, the descriptions are intended to be illustrative and are not intended to be limiting. Various modifications and applications may occur to those skilled in the art.

What is claimed is:

1. An apparatus comprising:
   an adaptive sideband filter configured to separately filter sidebands and a center frequency of a correlated in-phase signal and a correlated quadrature-phase signal to generate a filtered correlated in-phase signal and a filtered correlated quadrature-phase signal; and
   a space vehicle (SV) power modulation tracker configured to determine an angular orientation of a spinning object based at least partly on at least one of the filtered correlated in-phase signal or the filtered correlated quadrature-phase signal, wherein the adaptive sideband filter further comprises:
   a first positive phase rotator configured to positively phase rotate samples of the correlated in phase signal and the correlated quadrature phase signal by an amount per sample to generate a positively phase shifted in-phase signal and a positively phase shifted quadrature phase signal, respectively, wherein the amount per sample is related to an amount of rotation of the spinning object between a start of an integration period and a start of a sample period of the particular sample;

a first integrator configured to coherently integrate samples of the positively shifted in-phase signal and the positively shifted quadrature phase signal to generate first raw complex integration results at ends of integration periods;

a first negative phase rotator configured to negatively phase rotate the first raw complex integration results by an angle to generate first complex integration results, wherein the angle corresponds to a total amount of rotation of the spinning object from the start of a first sample of the integration period to the start of a last sample of the integration period;

a second negative phase rotator configured to negatively phase rotate samples of the correlated in phase signal and the correlated quadrature phase signal by the amount per sample to generate a negatively phase shifted in-phase signal and a negatively phase shifted quadrature phase signal, respectively;

a second integrator configured to coherently integrate samples of the negatively shifted in-phase signal and the negatively shifted quadrature phase signal to generate second raw complex integration results at ends of integration periods;

a second positive phase rotator positively phase rotate the second raw complex integration results by the angle to generate second complex integration results;

a third integrator configured to coherently integrate the correlated in phase signal and the correlated quadrature phase signal over the integration periods to generate third complex integration results; and a summer configured to sum the first, second, and third complex integration results to generate samples of the filtered correlated in phase signal and the filtered correlated quadrature phase signal.

2. The apparatus of claim 1, further comprising a positioning processor configured to acquire satellite positioning signals from a plurality of space vehicles and to generate the correlated in-phase signal and the correlated quadrature-phase signal from each of at least a portion of the plurality of acquired satellite positioning signals.

3. The method of claim 2, wherein the positioning processor is further configured to determine a translational position and a translational velocity of the spinning object based on the correlated in-phase signal and the correlated quadrature-phase signal and not on the filtered correlated in-phase signal and the filtered correlated quadrature-phase signal.

4. The apparatus of claim 1, wherein the SV power modulation tracker is further configured to determine a roll phase relative to each of the space vehicles corresponding to at least a selected group of the acquired plurality of satellite positioning signals by phase locking to an amplitude modulation of at least one of the filtered correlated in-phase signal or the filtered correlated quadrature-phase signal for each of the selected group of the acquired plurality of satellite positioning signals, wherein the amplitude modulation is caused by rolling of the object.

5. The apparatus of claim 1, wherein the adaptive sideband filter is further configured to;
filter a first sideband in a first path;
filter a second sideband in a second path;
filter the center frequency in a third path; and
combine results of filtering of the first path, the second path, and the third path to generate the filtered correlated in-phase signal and the filtered correlated quadrature-phase signal.

6. The apparatus of claim 1, wherein the integration period is 20 milliseconds.

7. The apparatus of claim 1, wherein the integration period corresponds to a time period between symbols of a navigation message.

8. The apparatus of claim 1, wherein the summer is configured to sum in an equally-weighted manner.

9. An apparatus comprising:
an adaptive sideband filter configured to separately filter sidebands and a center frequency of a correlated in-phase signal and a correlated quadrature-phase signal to generate a filtered correlated in-phase signal and a filtered correlated quadrature-phase signal; and
a space vehicle (SV) power modulation tracker configured to determine an angular orientation of a spinning object based at least partly on at least one of the filtered correlated in-phase signal or the filtered correlated quadrature-phase signal,
wherein the adaptive sideband filter is further configured to:
collect first samples of the correlated in-phase signal and the correlated quadrature-phase signal per integration period;
generate second samples from the first samples, wherein the second samples are positively phase rotated from the first samples by an amount per sample to compensate for a corresponding amount of rotation of the spinning object from a start of an integration period to a start of a sample period corresponding to the particular sample;
generate third samples from the first samples, wherein the third samples are negatively phase rotated from the first samples by an amount per sample to compensate for a corresponding amount of rotation of the spinning object;
coherently integrate the second samples to generate a first raw complex integration result per integration period;
coherently integrate the third samples to generate a second raw complex integration result per integration period;
negatively phase rotate the first raw complex integration results by an angle to generate first complex integration results, wherein the angle corresponds to a total amount of rotation of the spinning object from the start of a first sample of the integration period to the start of a last sample of the integration period;
positively phase rotate the second raw complex integration results by the angle to generate second complex integration results;
coherently integrate the first samples per integration period to generate third complex integration results; and
sum the first, second, and third complex integration results to generate samples of the filtered correlated in-phase signal and the filtered correlated quadrature-phase signal per integration period.

10. The apparatus of claim 9, wherein the integration period is 20 milliseconds.

11. The apparatus of claim 9, wherein the integration period corresponds to a time period between symbols of a navigation message.

12. The apparatus of claim 9, wherein the sum is performed in an equally-weighted manner.

13. A method for filtering, the method comprising:
receiving a correlated in-phase signal and a correlated quadrature-phase signal, wherein the correlated in-phase signal and the correlated quadrature-phase signal contain sidebands due to power modulation from rolling of a spinning object;
separately filtering the sidebands and a center frequency of the correlated in-phase signal and the correlated quadrature-phase signal to generate a filtered correlated in-phase signal and a filtered correlated quadrature-phase signal; and
determining an angular orientation of the spinning object based at least partly on at least one of the filtered correlated in-phase signal or the filtered correlated quadrature-phase signal,
wherein separately filtering further comprises:
positively phase rotating samples of the correlated in-phase signal and the correlated quadrature-phase signal by an amount per sample to generate a positively phase-shifted in-phase signal and a positively phase-shifted quadrature-phase signal, respectively, wherein the amount per sample is related to an amount of rotation of the spinning object between a start of an integration period and a start of a sample period of the particular sample;
coherently integrating samples of the positively-shifted in-phase signal and the positively-shifted quadrature-phase signal to generate first raw complex integration results at ends of integration periods;
negatively phase rotating the first raw complex integration results by an angle to generate first complex integration results, wherein the angle corresponds to an amount of rotation of the spinning object during the integration period;
negatively phase rotating samples of the correlated in-phase signal and the correlated quadrature-phase signal by the amount per sample to generate a negatively phase-shifted in-phase signal and a negatively phase-shifted quadrature-phase signal, respectively;
coherently integrating samples of the negatively-shifted in-phase signal and the negatively-shifted quadrature-phase signal to generate second raw complex integration results at ends of integration periods;
positively phase rotating the second raw complex integration results by the angle to generate second complex integration results;
coherently integrating the correlated in-phase signal and the correlated quadrature-phase signal over the integration periods to generate third complex integration results; and
summing the first, second, and third complex integration results to generate samples of the filtered correlated in-phase signal and the filtered correlated quadrature-phase signal.

14. The method of claim 13, further comprising determining a translational position and a translational velocity of the spinning object based on the correlated in-phase signal and the correlated quadrature-phase signal and not on the filtered correlated in-phase signal and the filtered correlated quadrature-phase signal.

15. The method of claim 13, wherein separately filtering further comprises:
filtering a first sideband in a first path;
filtering a second sideband in a second path;
filtering the center frequency in a third path; and
combining results of filtering of the first path, the second path, and the third path to generate the filtered correlated in-phase signal and the filtered correlated quadrature-phase signal.

16. The method of claim 13, wherein the integration period is 20 milliseconds.

17. The method of claim 13, wherein the integration period corresponds to a time period between symbols of a navigation message.

18. The method of claim 13, wherein summing is performed in an equally-weighted manner.

19. A method for filtering, the method comprising:
receiving a correlated in-phase signal and a correlated quadrature-phase signal, wherein the correlated in-phase signal and the correlated quadrature-phase signal contain sidebands due to power modulation from rolling of a spinning object;
separately filtering the sidebands and a center frequency of the correlated in-phase signal and the correlated quadrature-phase signal to generate a filtered correlated in-phase signal and a filtered correlated quadrature-phase signal; and
determining an angular orientation of the spinning object based at least partly on at least one of the filtered correlated in-phase signal or the filtered correlated quadrature-phase signal,
wherein separately filtering further comprises:
collecting first samples of the correlated in-phase signal and the correlated quadrature-phase signal per integration period;
generating second samples from the first samples, wherein the second samples are positively phase rotated from the first samples by an amount per sample to compensate for a corresponding amount of rotation of the spinning object;
generating third samples from the first samples, wherein the third samples are negatively phase rotated from the first samples by an amount per sample to compensate for a corresponding amount of rotation of the spinning object from a start of an integration period to a start of a sample period corresponding to the particular sample;
coherently integrating the second samples to generate a first raw complex integration result per integration period;
coherently integrating the third samples to generate a second raw complex integration result per integration period;
negatively phase rotating the first raw complex integration results by an angle to generate first complex integration results, wherein the angle corresponds to a total amount of rotation of the spinning object from the start of a first sample of the integration period to the start of a last sample of the integration period;
positively phase rotating the second raw complex integration results by the angle to generate second complex integration results;
coherently integrating the first samples per integration period to generate third complex integration results; and
summing the first, second, and third complex integration results to generate samples of the filtered correlated in-phase signal and the filtered correlated quadrature-phase signal per integration period.

20. The method of claim 19, wherein the integration period is 20 milliseconds.

21. The method of claim 19, wherein the integration period corresponds to a time period between symbols of a navigation message.

22. The method of claim 19, wherein summing is performed in an equally-weighted manner.

\* \* \* \* \*

UNITED STATES PATENT AND TRADEMARK OFFICE
CERTIFICATE OF CORRECTION

PATENT NO. : 9,983,315 B1
APPLICATION NO. : 14/726086
DATED : May 29, 2018
INVENTOR(S) : Steven B. Alexander et al.

Page 1 of 1

It is certified that error appears in the above-identified patent and that said Letters Patent is hereby corrected as shown below:

On Column 17, Line 45, In Claim 3, change "method" to --apparatus--.

On Column 17, Line 64, In Claim 5, change "to;" to --to:--.

Signed and Sealed this
Eighteenth Day of September, 2018

Andrei Iancu
*Director of the United States Patent and Trademark Office*